United States Patent
Barasch

(10) Patent No.: US 10,022,292 B2
(45) Date of Patent: Jul. 17, 2018

(54) MASSAGER COMMUNICATION DEVICE, SYSTEM, AND METHOD

(71) Applicant: Maxine L. Barasch, Albany, NY (US)

(72) Inventor: Maxine L. Barasch, Albany, NY (US)

( * ) Notice: Subject to any disclaimer, the term of this patent is extended or adjusted under 35 U.S.C. 154(b) by 0 days.

(21) Appl. No.: 14/769,514

(22) PCT Filed: Dec. 23, 2014

(86) PCT No.: PCT/US2014/072157
§ 371 (c)(1),
(2) Date: Aug. 21, 2015

(87) PCT Pub. No.: WO2015/100326
PCT Pub. Date: Jul. 2, 2015

(65) Prior Publication Data
US 2016/0310353 A1 Oct. 27, 2016

Related U.S. Application Data

(63) Continuation-in-part of application No. 14/140,435, filed on Dec. 24, 2013, now Pat. No. 9,682,007.
(Continued)

(51) Int. Cl.
*A61H 19/00* (2006.01)
*A61H 23/02* (2006.01)
(Continued)

(52) U.S. Cl.
CPC .............. *A61H 19/40* (2013.01); *A61H 19/00* (2013.01); *A61H 19/30* (2013.01); *A61H 23/004* (2013.01);
(Continued)

(58) Field of Classification Search
CPC ........ A61H 19/00; A61H 19/30; A61H 19/40; A61H 19/44; A61H 23/004; A61H 23/0263
(Continued)

(56) References Cited

U.S. PATENT DOCUMENTS 6,793,619 B1  9/2004  Blumental
9,682,007 B2  6/2017  Barasch
(Continued)

FOREIGN PATENT DOCUMENTS

CN  102883678 A  1/2013
DE  10052368 A1  5/2002
EP  2129351 A2  12/2009

OTHER PUBLICATIONS

Young, International Application No. PCT/US14/72157, Search Report dated Apr. 2, 2015, 11 pages.
(Continued)

*Primary Examiner* — John Lacyk
(74) *Attorney, Agent, or Firm* — Maxine L. Barasch; Keohane & D'Alessandro, PLLC

(57) ABSTRACT

Embodiments of the present invention provide a massager device, system, and method. A massager is configured to communicate (directly or indirectly) a user feedback message to a target in response to a determination that an event has occurred. The massager may be a sexual aid. User feedback messages may be generated based on various pre-sets and/or user selections established to determine a message medium type, content for inclusion in the user feedback message, the target, the event, and other customizations. The content of the user feedback messages may be generated according to a content selection method, such as random, user-customized, pre-sets, categorical, or based on usage parameters, such as biometric, massager settings, and temporal data.

20 Claims, 20 Drawing Sheets

Related U.S. Application Data

(60) Provisional application No. 61/928,991, filed on Jan. 17, 2014.

(51) Int. Cl.
  *G06Q 30/00* (2012.01)
  *G06Q 50/10* (2012.01)
  *A61H 23/00* (2006.01)
  *H04W 4/12* (2009.01)
  *H04L 12/58* (2006.01)

(52) U.S. Cl.
  CPC ......... *A61H 23/0263* (2013.01); *G06Q 30/00* (2013.01); *G06Q 50/10* (2013.01); *H04W 4/12* (2013.01); *A61H 2201/0207* (2013.01); *A61H 2201/0214* (2013.01); *A61H 2201/0285* (2013.01); *A61H 2201/501* (2013.01); *A61H 2201/5012* (2013.01); *A61H 2201/5025* (2013.01); *A61H 2201/5041* (2013.01); *A61H 2201/5043* (2013.01); *A61H 2201/5046* (2013.01); *A61H 2201/5061* (2013.01); *A61H 2201/5082* (2013.01); *A61H 2201/5097* (2013.01); *A61H 2230/00* (2013.01); *A61H 2230/065* (2013.01); *A61H 2230/305* (2013.01); *A61H 2230/505* (2013.01); *A61H 2230/655* (2013.01); *H04L 51/04* (2013.01)

(58) Field of Classification Search
  USPC ..................................................... 600/38–41
  See application file for complete search history.

(56) References Cited

U.S. PATENT DOCUMENTS

| | | |
|---|---|---|
| 2004/0082831 A1 | 4/2004 | Kobashikawa et al. |
| 2005/0119702 A1 | 6/2005 | Simmons |
| 2006/0079732 A1 | 4/2006 | Blumenthal |
| 2010/0034471 A1 | 2/2010 | Dawe |
| 2011/0133910 A1 | 6/2011 | Alarcon |
| 2012/0040655 A1 | 2/2012 | Larkin |
| 2014/0155225 A1 | 6/2014 | Sedic |
| 2015/0174000 A1 | 6/2015 | Barasch |

OTHER PUBLICATIONS

Matthews, Christine Hopkins, U.S. Appl. No. 14/140,435, Office Action dated Jun. 26, 2015, 18 pgs.

Matthews, Christine Hopkins, U.S. Appl. No. 14/140,435, Final Office Action dated Dec. 22, 2015, 17 pgs.

Matthews, Christine Hopkins, U.S. Appl. No. 14/140,435, Office Action dated May 13, 2016, 7 pgs.

Matthews, Christine Hopkins, U.S. Appl. No. 14/140,435, Final Office Action dated Nov. 29, 2016, 7 pgs.

Matthews, Christine Hopkins, U.S. Appl. No. 14/140,435, Notice of Allowance dated Feb. 15, 2017, 12 pgs.

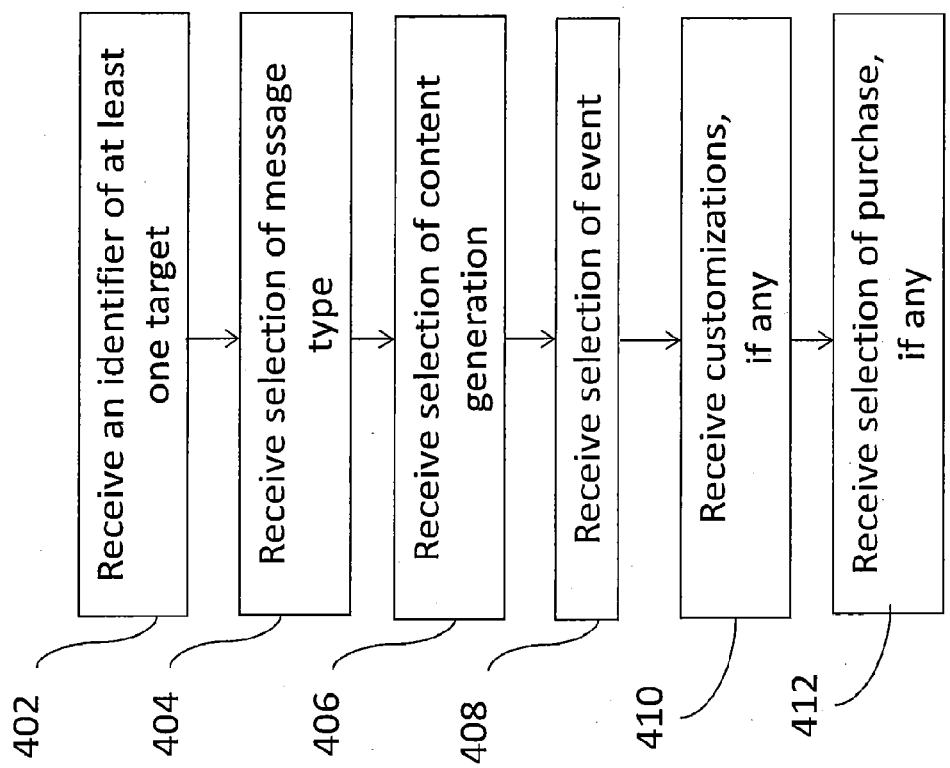

| Intensity | Rating | Attribute word | Content Item |
|---|---|---|---|
| 1 | 3 | 0x0 | Hope you feel better now. |
| 3 | 5 | 0x1 | Hey $, that was too fast! |
| 5 | 7 | 0x2 | I love a hard grip! |
| 4 | 8 | 0x0 | That was hot!! You should check out www.xxx.yyy |

Figure 11

MASSAGER COMMUNICATION DEVICE, SYSTEM, AND METHOD

CROSS-REFERENCE TO RELATED APPLICATIONS

The present patent document is a continuation in part of, and claims priority to, U.S. patent application Ser. No. 14/140,435 filed Dec. 24, 2013. The present patent document also claims priority to U.S. Provisional Patent Application No. 61/928,991 filed Jan. 17, 2014. The disclosures of both U.S. patent application Ser. No. 14/140,435 and U.S. Provisional Patent Application No. 61/928,991 are incorporated herein by reference.

FIELD OF THE INVENTION

The present invention relates generally to massagers, and more particularly, to massagers with communication capability.

BACKGROUND

Massagers are used to massage muscles or other body parts for relaxation, pain relief, or stimulation of sexual pleasure. Although conventional massagers can induce such physical relaxation, relief, or sexual stimulation/pleasure, they leave a void as to psychological stimulation, for example, suggestions, kind words, encouragement, or erotic feedback relating to the use of the massager.

SUMMARY

In a first aspect, embodiments of the present invention provide a massager comprising: a vibration unit; and at least one computing device comprising a processor and memory, the memory comprising instructions, which when executed by the processor, cause the at least one computing device to: receive user input comprising a user preference; analyze usage data for the massager; determine that an event has occurred based on a user data message; and communicate at least one user feedback message, the at least one user feedback message comprising at least one item of content, selected based on the user preference, to a target in response to the determination.

In a second aspect, embodiments of the present invention provide a computer-implemented method comprising: receiving user input comprising a user preference; receiving a user data message comprising usage data of a massager; determining that an event has occurred based on the usage data; and communicating at least one message, the at least one message comprising at least one item of content, selected based on the user preference, to a target in response to the determination.

In a third aspect, embodiments of the present invention provide a system comprising: a massager; and an application server, wherein the application server comprises a processor and memory, the memory comprising instructions to: receive user input comprising a user preference; receive a user data message from the massager; determine that an event has occurred based on the user data message; and communicate at least one message, the at least one user feedback message comprising at least one item of content, selected based on the user preference, to a target in response to the determination.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements. Furthermore, certain elements in some of the figures may be omitted, or illustrated not-to-scale, for illustrative clarity.

FIG. 4 shows a flow diagram of a method for programming operation of the massager/system.

FIG. 10A shows a flow diagram of a method for generating content for a user feedback message based on duration of use.

FIG. 10B shows a flow diagram of a method for generating content for a user feedback message based on usage pressure.

FIG. 10C shows a flow diagram of a method for generating content for a user feedback message based on user heart rate.

FIG. 10D shows a flow diagram of a method for generating content for a user feedback message based on temperature setting.

FIG. 11 shows an example database table for storing and organizing items of content.

DETAILED DESCRIPTION OF EMBODIMENTS OF THE INVENTION

Figure 1:
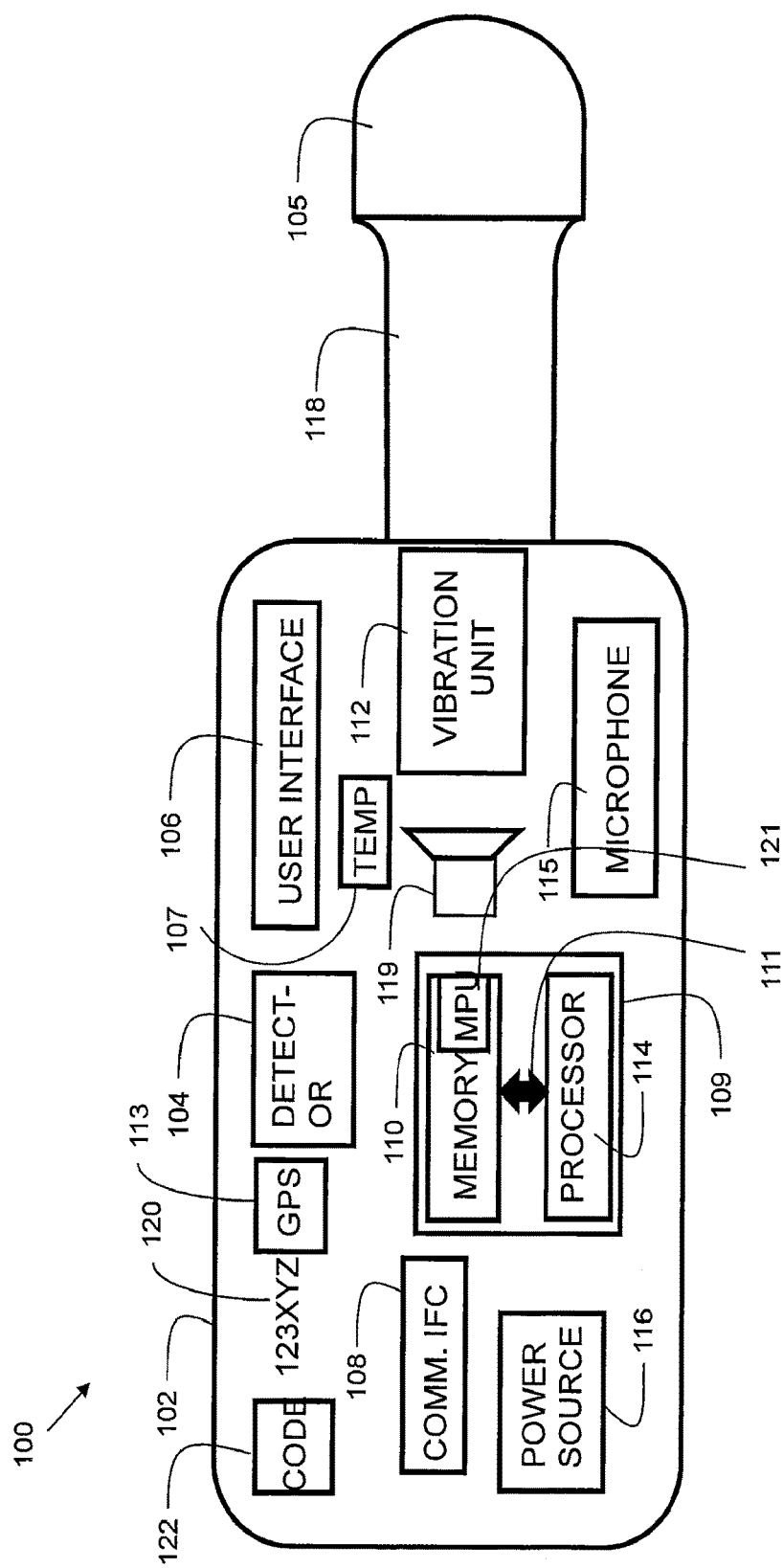
FIG. 1 shows a block diagram view of a massager in accordance with embodiments of the invention.

Embodiments of the present invention provide a massager that is configured to communicate (directly or indirectly) a user feedback message to a remote device in response to a determination that an event has occurred. In some embodiments, the massager may be configured to induce muscle relaxation and/or pain relief when applied to an area of the body. In some embodiments, the massager may be configured as a sexual aid when applied to "erogenous zone(s)" of the body (i.e. sex organ(s)). User feedback messages may be automatically generated based on various pre-sets or user selections established to determine the target, event, content, message medium type, and other customizations. Content of the user feedback messages may be generated based on a variety of options, such as random, categorical, customized, or based on usage parameters, such as biometric, temporal, and user settings information.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. Features, structures, or characteristics of one embodiment can be mixed and matched with features, structures, or characteristics of another embodiment. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

"Massager", as used herein, refers to a device configured to induce stimulation to one or more body parts for example, without limitation, genetalia, anus, or breasts. Typically, such stimulation is induced via at least a vibration unit, but may include, instead of or in addition, further apparatus(es) to enhance such stimulation, for example, without limitation, beads, various textures of the housing, rotation of portions of the housing, etc.

"User feedback message", as used herein, is a communication. A user feedback message is of a "message medium type", such as, for example, an email message, a text message (such as short message service (SMS) message), an instant message (such as AOL® instant message), a multimedia message (such as MMS message), a voice message, a voice mail message, a video message, an automated telephone call, a voice-over IP call, a social media message (such as Facebook® message, Twitter Message®, Linked-In Message®, etc.), a social media post (such as a post to a Facebook® Wall®, a "tweet" on Twitter®, etc.), a blog post, or any other form of electronic or automated communication now known or hereafter developed.

"User data message", as used herein, is a message/data structure containing information about the user and/or usage of the massager. A user data message may contain information about the most recent usage of the massager, The usage data may include, but is not limited to, duration of usage, time of day when the massager transitions from an ON state to an OFF state, biometric readings, such as heart rate or pulse, and/or user settings, such as heat and vibration intensity settings.

The "content" of the user feedback message may include one or more of text (e.g., a phrase, etc.), image (e.g., photograph, illustration, etc.), video, audio (e.g., MP3, LCPM, or other suitable format), webpage (implemented with HTML, Java, or any other suitable language), website link, and any other suitable form of content. A particular instance of such content (e.g., a particular phrase, image, photo, illustration, video, audio clip, webpage, or website link, etc.) may also be referred to herein as an "item of content" or a "content item".

A "target", as used herein, is an intended recipient address/destination of a user feedback message. The target may be a phone number, email address, voicemail box, social media receptacle (like Facebook® private messenger inbox, Twitter® private messenger inbox, Facebook® Wall®, Twitter feed, Linked-In® account, etc.), instant message inbox (e.g., AOL® instant messenger inbox), or any other address/destination for receipt of messages now known or hereafter developed.

An "event", as used herein, is a trigger for sending a user feedback message to the target(s). An event may be, for example, deactivation of a vibration unit of the massager (transitioning the vibration unit from an ON to OFF state), activation of the vibration unit, powering off the massager, powering on the massager, and/or a predetermined duration of time elapsing after any of the aforementioned events. These are examples, and any other suitable event is included within the scope of the invention.

A "button", as used herein, is control on a graphical user interface that, in response to being selected by a user, performs a function. Typically, a button is embodied as an icon, which may be selected by clicking on by a user using a mouse. A "field", as used herein, is a section of a graphical user interface in which text may be entered by the user. A "drop box", as used herein, is a menu box, which when an associated icon, for example, an arrow, is selected, a menu of choices (from which the user may select) appears. A "radio button", as used herein, is a type of graphical user interface element that allows the user to choose one of a predefined set of options. A "check box", as used herein, is any of a set of options from which multiple ones may be selected at a given time. Check boxes are typically embodied as open squares, each of which is in proximity to a set of associated options. When a user clicks with a mouse, or otherwise selects one or more boxes, a check mark typically appears on the GUI in the box. It will be recognized these mechanisms for accepting user input are examples, and they may be interchanged with one another (or with suitable other mechanisms not herein described) where feasible without departing from the scope of the invention.

Referring now to FIG. 1, there is shown an example of massager 100 in accordance with some embodiments of the present invention. The massager has a housing 102, which may be made of plastic, glass, composite material, or any other suitable material now known or hereafter developed. A power source 116 receives and/or supplies electricity to power the various other components, which may include communications interface 108, computer 109, and at least one usage parameter detector 104 (which may be biometric or any other suitable sensor/encoder/timer for sensing usage parameters), user interface 106, speaker 119, and microphone 115. Furthermore, massager 100 may have a vibration unit 112, which may be mechanically coupled to external shaft 118. In some embodiments, the vibration unit can be substituted with another suitable massage mechanism. Some embodiments may include more or fewer features/components than those described/shown herein without departing from the scope and purpose of the invention. In some embodiments, shaft 118 of massager 100, or the massager 100 itself, is configured for applying pressure to one or more human body parts, and/or in some embodiments, animal body parts. In some embodiments (for example, where the massager is configured as a sexual aid), the shaft 118 and/or massager 100 may be configured for stimulation of a human penis, stimulation of/insertion into a human vagina or anus, and/or to apply pressure to one or more of those areas. In some embodiments, the housing is shaped ergonomically to fit a gripping hand. In some embodiments, the shaft 118 is elongated with a bulbous head 105 to mimic the look and/or feel of a human penis. In some embodiments, the shaft 118 and/or the massager 100, itself, may be shaped like a tube, a "bullet", an "egg", a "ring", a sphere, or any other suitable shape or combination of shapes (e.g., a ball on the end of a tube, etc.), each of which is included within the scope of the invention.

In some embodiments, the shaft 118 and/or the massager 100 may be configured generically for massage, for example, comprising a substantially cylindrical shape or other suitable shape. In some embodiments, the shaft 118 may be configured for ergonomic massage of a neck, shoulder, knee, foot, back, hand, fingers, or any other suitable body part(s).

In some embodiments, the shaft 118 and the housing 102 are one and the same (i.e. a single apparatus), or are substantially contiguously connected. In some embodiments, more than one shaft may be included.

In some embodiments, the shaft 118 and/or massager 100 may be any suitable mechanism for delivery of the vibration of the massager to the body part(s). Some embodiments may not include a shaft per se. For example, the massager can be configured as a massage chair, a dual-headed neck massager, or a sphere-shaped hand massager, etc. So the term "shaft" shall be interpreted herein to include any suitable massage delivery mechanism.

The vibration unit 112 is any suitable apparatus for producing oscillation of massager 100. A vibration unit 112 may be a geared motor mechanism, which may have, e.g., an asymmetrical load affixed to a rotating shaft, a linear resonant actuator, or a pancake vibration motor, etc. It will be recognized that any suitable vibration or massage mechanism now known or hereafter developed may be substituted for, or used in addition to, the examples disclosed herein without departing from the scope and purpose of the present invention.

In some embodiments, the power source 116 includes batteries, which may be replaceable, or internally sealed rechargeable batteries. In some embodiments, the power source may be AC power. In still other embodiments, the power source may be a combination of AC and/or battery power. It will be recognized that any suitable powering mechanism now known or hereafter developed may be substituted for, or used in addition to, the examples disclosed herein without departing from the scope and purpose of the present invention.

User interface 106 comprises a mechanism for massager 100 to receive input from a user (and in some embodiments, to present feedback to the user). In some embodiments, the input may be selection of power on/power off, selection of the vibration settings (e.g., high, medium, or low intensity, or a particular pattern, etc.), and/or selection of other settings such as, for example, a temperature of a heating/cooling mechanism 107 within the massager 100, etc. The heating/cooling mechanism 107 may be configured and disposed to provide heat and/or cooling to the external shaft 118. In embodiments, the heating may be achieved through a resistive heat process. In other embodiments, heating or cooling may be accomplished using a thermoelectric component, such as a thermoelectric cooler (Peltier cooler) disposed within shaft 118. In some embodiments, user interface 106 includes at least one of: button, slider switch, screen, keypad, any combination thereof, or any other suitable input interface, now known or hereafter developed. In embodiments including a screen, the screen can be a light-emitting diode (LED) display, liquid crystal display (LCD), plasma, or any other suitable display mechanism. In some embodiments, the screen may be a "touch screen". In some embodiments, input may be entered additionally or alternatively through voice recognition commands via microphone 115. For example, a user may speak a phrase such as "send message one hour after" in order to have a user feedback message (e.g. e-mail) sent one hour after usage.

In some embodiments, massager 100 includes an on-board or attached (via wires or wirelessly) computer 109 including a processor 114, memory 110, and bus 111. Memory 110 may be a computer-readable storage medium, such as flash, ROM, battery-backed SRAM, and/or other suitable technology now known or hereafter developed. In some embodiments, memory 110 may be non-transitory. Processor 114 is configured and disposed to access instructions stored in memory 110 and execute them to provide one or more of the various functionalities of massager 100.

In some embodiments, the on-board computer 109 implements the message processing unit ("MPU") 121, i.e., the at least one computing device which holds the instructions (and repository, where required) to provide one or more of the various functionalities of the massager. In other embodiments, as described with respect to FIG. 2, the message processing unit is remote from the massager, such as MPU 209 at application server 210, or as MPU 211 at remote device 204. In some embodiments, the message processing unit includes both an on-board computer 109 and at least one of an application server 210 and remote device 204, as each may perform some, but not all of the functionalities described herein. In some embodiments, the message processing unit is a distributed computing system. For example, without limitation, in some embodiments, portions of the message processing unit may be implemented on massager 202 (computer 109) and application server 210, and in other embodiments, additionally, on remote device 204.

Figure 2:
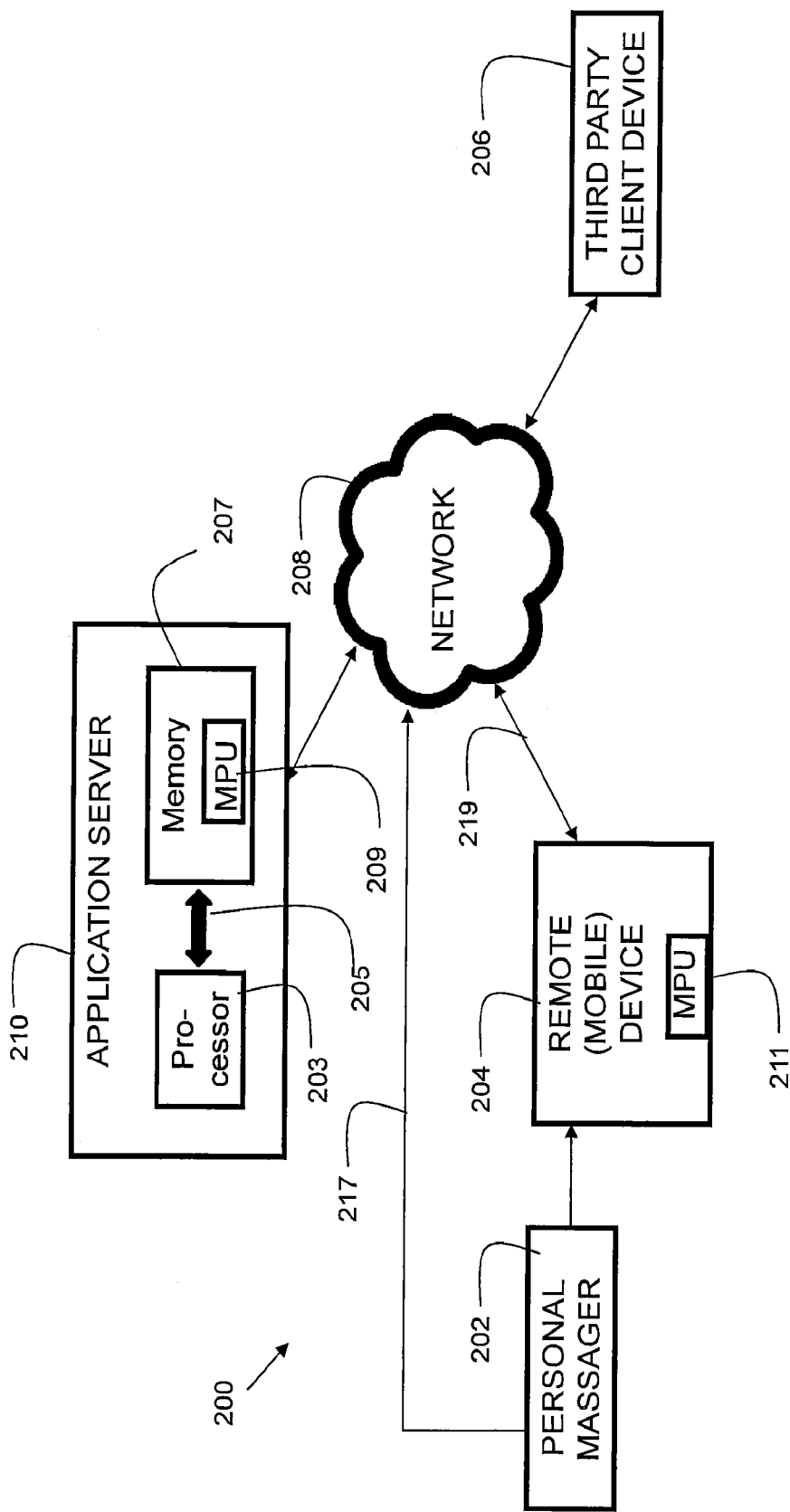
FIG. 2 shows a diagram of a system in accordance with embodiments of the invention.

Referring to FIG. 2, there is shown an example of a system in accordance with embodiments of the invention. In some embodiments, massager 202 may be configured to communicate (directly or indirectly) over a network with an application server 210. Massager 202 may have all or any subset of the features of massager 100. In some embodiments, application server 210 implements the message processing unit, which includes a processor 203, bus 205, and memory 207 to hold the repository and instructions to provide one or more of the various functionalities of massager 202. Memory may include a computer storage device which may be, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other suitable medium/device. In some embodiments, massager 202 is configured to communicate with application server 210 directly through network 208. For example, in such embodiments, massager 202 includes a communication interface 108 for wirelessly transmitting information over network 208 to application server 210. In embodiments, the message processing unit acts on a user data message—in response to determination that an event has occurred, the message processing unit generates user feedback messages that are sent to a target for presentation to a user.

In some embodiments, massager 202 may communicate with a remote device 204 (such as a mobile phone, tablet computer, or any other suitable device now known or hereafter developed), which in turn communicates with application server 210 via communication link 219 to network 208. In some embodiments, communication interface 108 may be a near field communication protocol like Bluetooth® or Zigbee®, or any other suitable technology now known or hereafter developed, for wirelessly transmitting information over network 208 to remote device 204. Remote device 204 may be a mobile device, including, but not limited to, a smart phone, a tablet computer, or a laptop/desktop computer. In embodiments, network 208 may be any suitable network such as a wide area network (WAN), a local area network (LAN), a virtual private network (VPN), a cloud computing network, the Internet, any combination thereof, and/or any other suitable network now known or hereafter developed. Application server 210 may receive a user feedback message (directly or indirectly) from the massager 202, and in response a determination that an event has occurred, communicate a message to a target, for example, without limitation, for display on the remote device 204 or another client device 206. In embodiments, the massager 202 transmits and receives data over network 208 via direct communication path 217. In such embodiments, the massager 202 comprises a communication interface 108 that has such capability, which may include WiFi (wireless internet), cellular network interface, or other suitable interface for communication with network 208 without using remote device 204. It will be recognized that the components shown in FIG. 2 are meant to be examples, and in some embodiments, more or fewer components may be connected to the network. It will also be recognized that the features of massager 202 described herein are examples, and that some embodiments may include more or fewer features.

In some embodiments, much of the functionality that is described herein as executed from the application server (e.g., 210 of FIG. 2), can instead be executed from on-board computer (e.g., 109 of FIG. 1). In such embodiments, the on-board computer implements the message processing unit. A massager in accordance with such embodiments may communicate messages directly from the computer 109 to the target over the network 208.

In some embodiments, the massager may be a "self-contained" system (i.e., function without network connectivity) with user interface 108 including a screen 106 and/or a speaker 119 for input of user preferences and delivery of the user feedback message to a user. The message processing unit is implemented by the on-board computer. In such embodiments, however, massager 100 may still include communication interface 108 providing network (e.g., network 208 of FIG. 2) connectivity for accessing updates, or connecting to an application server.

It will be recognized that these implementations are examples, and that any feasible implementation of the device, system, and method is included within the scope of the invention.

Figure 3:
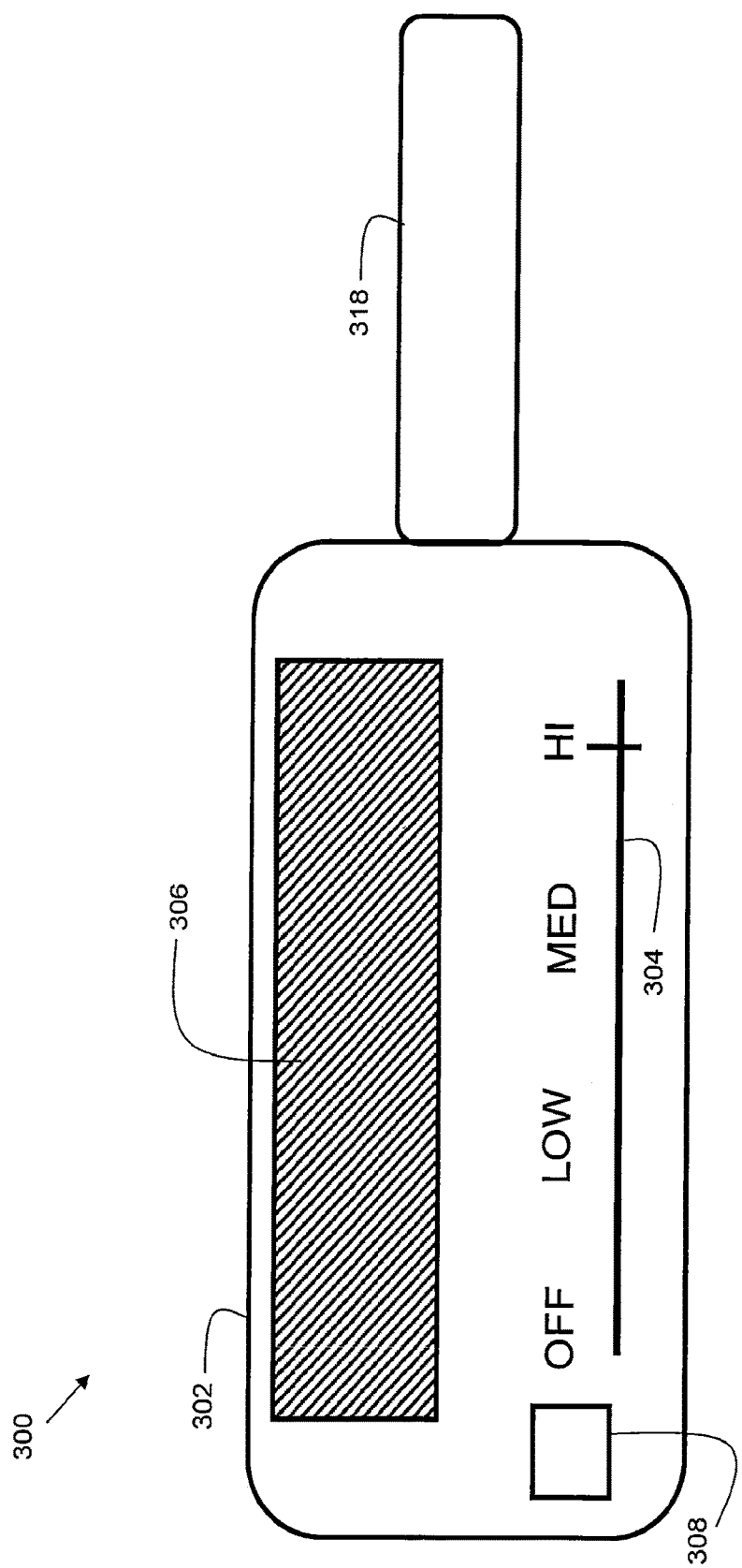
FIG. 3 shows a massager in accordance with embodiments of the invention.

FIG. 3 shows massager 300 in accordance with embodiments of the invention. Massager 300 includes housing 302. Disposed on housing 302 is a user interface, shown here as two components including (slider) controls 304 and biometric sensor 306.

Controls 304 may include vibration settings. Additionally, controls 304 may include temperature settings (if the massager includes a mechanism for temperature control, such as a heating/cooling element 107 of FIG. 1) or light settings (if the massager includes a mechanism 308 for illumination). Illumination/light source mechanism 308 may include incandescent light, fluorescent light, black light, CFL, light emitting diode (LED), or any other suitable lighting). In some embodiments, the controls may include more or fewer settings options.

In embodiments, massager 300 includes at least one detector 308 for monitoring one or more usage parameters. Detector may include, for example, a sensor, encoder, or any other suitable mechanism. In some embodiments, the detector(s) include at least one of a heart rate sensor, a blood pressure sensor, a body temperature sensor, a pulse sensor, a skin conductivity sensor, a moisture sensor, a pressure sensor, a grip pressure sensor, a timer, a temperature setting switch encoder, a vibration setting switch encoder, and a light setting switch encoder. Accordingly, one or more physiological parameters of a user may be measured. During use of massager 300, the user's hand or fingers may make contact with biometric sensor 306, such that one or more such physiological parameters can be measured. Physiological parameters, which may be measured, include, but are not limited to: heart rate, pulse, blood pressure, body temperature, skin conductivity, moisture, grip pressure, usage pressure, and any other suitable parameters. For example, the biometric sensor 306 may include a strain gauge (which serves as a grip pressure sensor). The biometric sensor 306 may include electrodes for contact with the user's skin to measure the heart rate, blood pressure, body temperature (thermometer), and/or pulse. The biometric sensor may include sensors, which sense moisture (for example, sweat or other bodily fluids). It will be recognized that any suitable physiological parameters may be measured with sensors or other mechanisms now know or hereafter developed without departing from the scope and purpose of the present invention. Using such a sensor (e.g. grip pressure) embodiments of the present invention send a user feedback message based on an exerted grip pressure during last usage.

The detector 308 may be configured to measure usage parameters other than biometric parameters. The other usage parameters include but are not limited to the speed/intensity of the vibration, the pattern of the vibration, a brightness and/or pattern (i.e., strobe, color-changes, etc.) of an illumination/light source mechanism, a temperature of an on-board heating/cooling mechanism, amount of time the vibration unit was activated, the amount of time the massager was powered up, the amount of pressure applied to the body area (i.e., how hard the user pushed the shaft against her/his skin), and any other suitable setting. In some embodiments, a strain gauge may be present within the massager, and used to measure the applied force.

It will be recognized that the features of massager 300 described herein are examples, and that some embodiments may include more or fewer features.

Figure 3A:
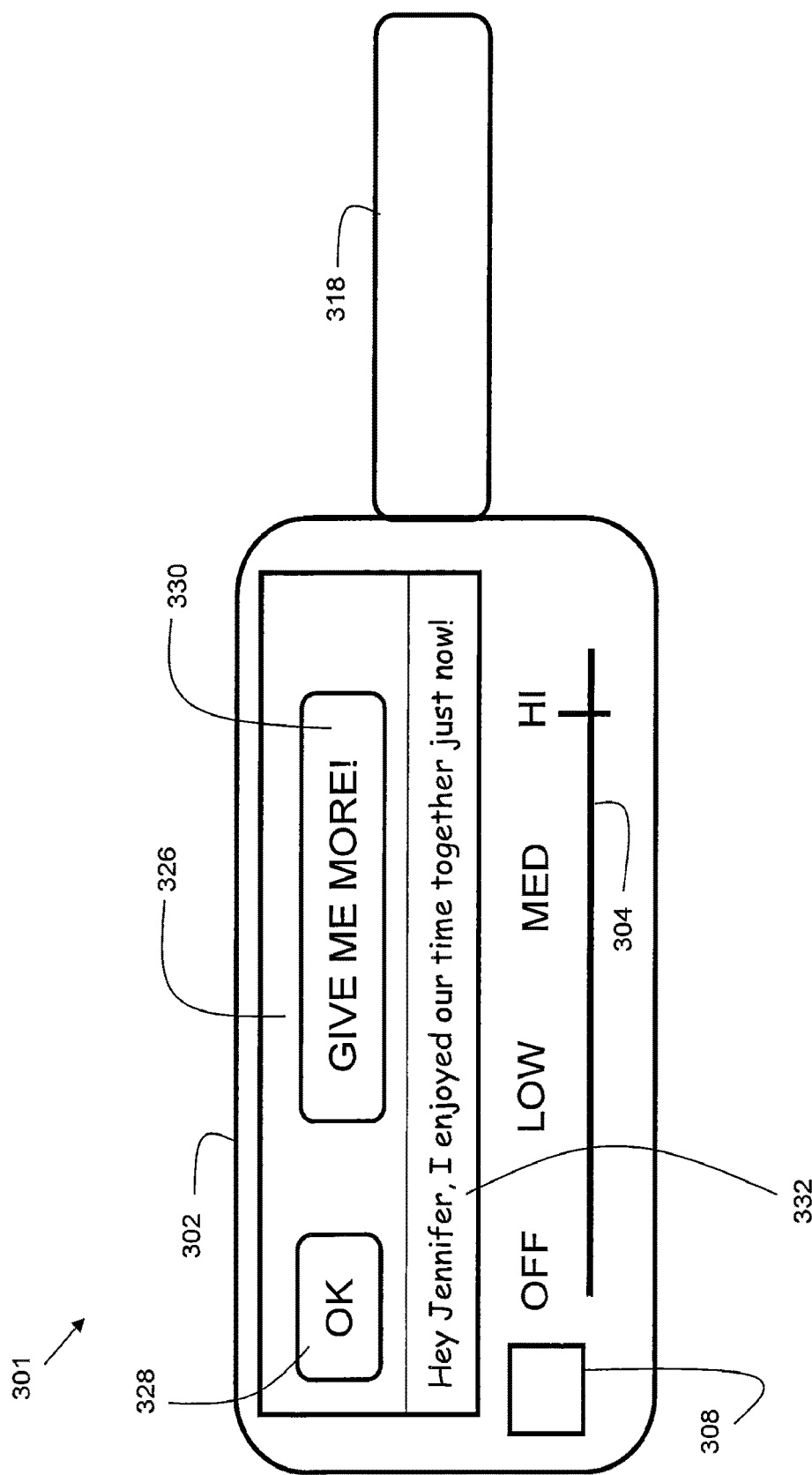
FIG. 3A shows a massager in accordance with embodiments of the invention.

FIG. 3A shows a massager 301 in accordance with alternative embodiments of the invention. In this embodiment, a user display 326 is integrated into the massager 301. In embodiments, the user display 326 is a touch screen, such as a capacitive touch screen or a resistive touch screen. Thus, user display 326 can serve as an input device as well as an output device, and the user can press buttons to enter information, such as options and preferences. As can be seen in this example, a user feedback message 332 is displayed on user display 326. This type of message is displayed upon a transition of the vibration unit from the ON state to the OFF state (e.g. when the user is finished using the device). That is, a transition of the vibration unit from the ON state to the OFF state may serve as an event, which when detected, triggers the display of a message.

An OK button 328 may be pressed to acknowledge the message 332. Optionally, button 330 may be pressed to generate a new user feedback message to be displayed on user display 326. In some embodiments, the user feedback user feedback message 332 may also be output via an on-board speaker (see 119 of FIG. 1) utilizing a text-to-speech function implemented by the on-board processor (see 114 of FIG. 1).

It will be recognized that the features of massager 301 described herein are examples, and that some embodiments may include more or fewer features Referring now to FIG. 4, there is shown a flow diagram of a method for programming operation of the massager/system according to user input of user preferences. In step 402, the user is prompted to enter at least one target. The target is an intended recipient address or destination of a user feedback message. In some embodiments, multiple targets may be established. In step 404, the user is prompted to select a medium type of a user feedback message she wishes to be sent. In step 406, the user is prompted to select a method of content generation for the user feedback message. In step 408, the user is prompted to enter a (triggering) event. In step 410, the user is prompted to enter other customizations, if any. In step 412, the user is prompted to enter automated purchase information, if any. The entered data is received at the message processing unit. It will be recognized that in some embodiments of the invention, more or fewer steps could be included, some of the steps may be performed simultaneously, and/or the order of the steps may be different. It will also be recognized that in some embodiments, one or more of these options can be default or standard settings, rather than user-defined. For example, the user may only be required to enter a target, while the content, event, and message medium type may be preprogrammed without input from the user. In another example, there may be a single content selection method, so user selection of such method would not be available. As yet another example, steps 410 and 412 could be omitted.

Figure 5:
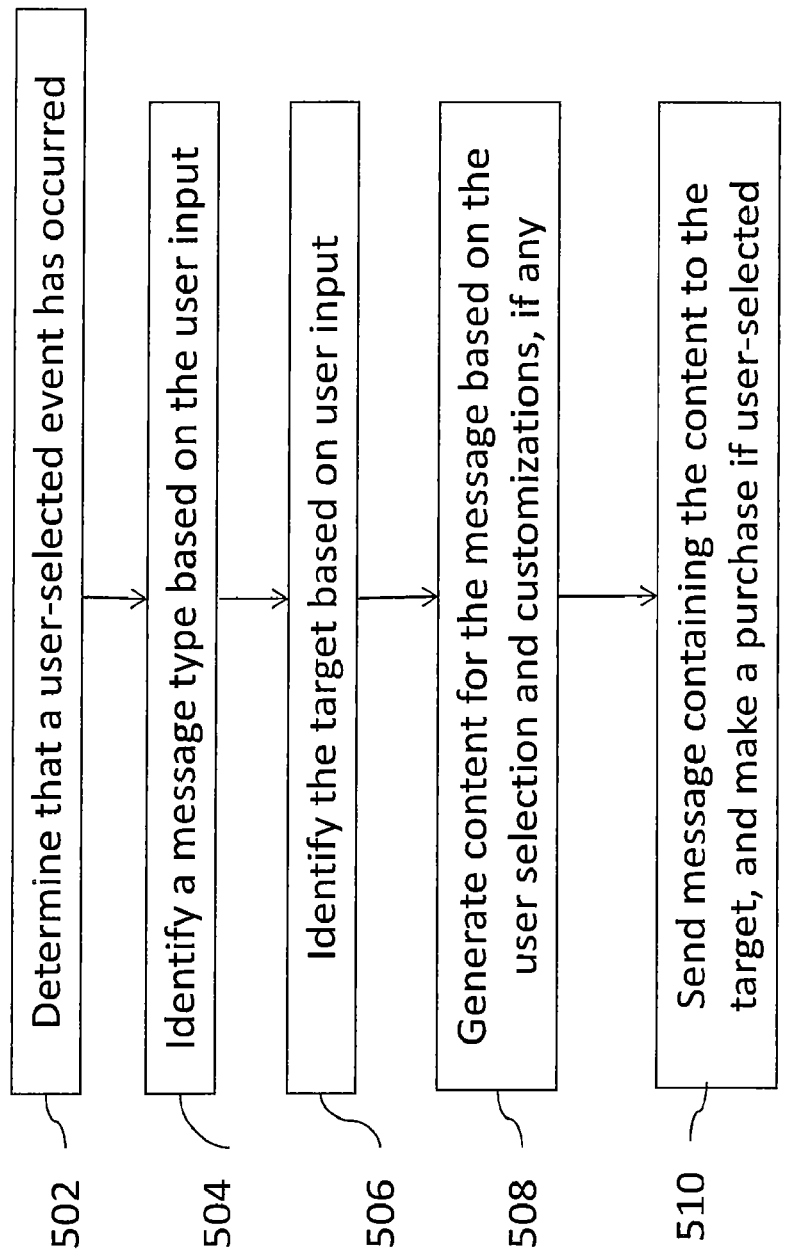
FIG. 5 shows a flow diagram of a method for generating and sending a user feedback message to a target.

Referring now to FIG. 5, there is shown a method flow diagram of a method for generating and sending a user feedback message to a target. In some embodiments, the message processing unit, e.g., the application server may be monitoring for occurrence of the event. In step 502, a determination is made that the event has occurred. In step 504, a message medium type is determined based on user input. In step 506, a target is identified based on user input. In step 508, content for the message is generated. In embodiments, the content may be generated based on a user-selected method and customizations, if any. In step 510, a message of the identified message medium type containing the generated content and having the determined customizations is sent to the target(s) (and an automated purchase made if pre-selected by the user) in response to the determination that the event has occurred. It will be recognized that in some embodiments of the invention, more or fewer steps could be included, some of the steps may be performed simultaneously, and/or the order of the steps may be different.

In embodiments where the massager is self-contained, no registration of the massager may be necessary. A user may simply power on the massager and enter her/his selections via a user interface (e.g. 326 of FIG. 3A) associated with the massager. In some embodiments, although the massager may contain various capabilities on-board, such as a content repository, the massager may still be enabled to communicate with a remote device or network (wirelessly or wired, e.g., USB) for sending user feedback messages, accessing an application server, and/or accessing software updates, etc., so registration capabilities may still be provided.

In embodiments where the massager communicates with an application server, a user may need to visit a website of a solution service provider to access the application server. In practice, for example, a user either may enter a domain name of a website associated with the solution service provider into an appropriate field of a web browser appearing on an interface of a computing device or click on the domain name from a search engine or other page. It will be recognized that these methods of accessing the application server are examples, and that any suitable method is included within the scope of the invention. Upon the website of the solution service provider appearing on the screen, the user may then be prompted to create an account, if she has not done so previously. Once the user is logged into her/his account, she may be prompted to register/associate her/his massager with her/his account, if she has not done so previously.

Figure 6:
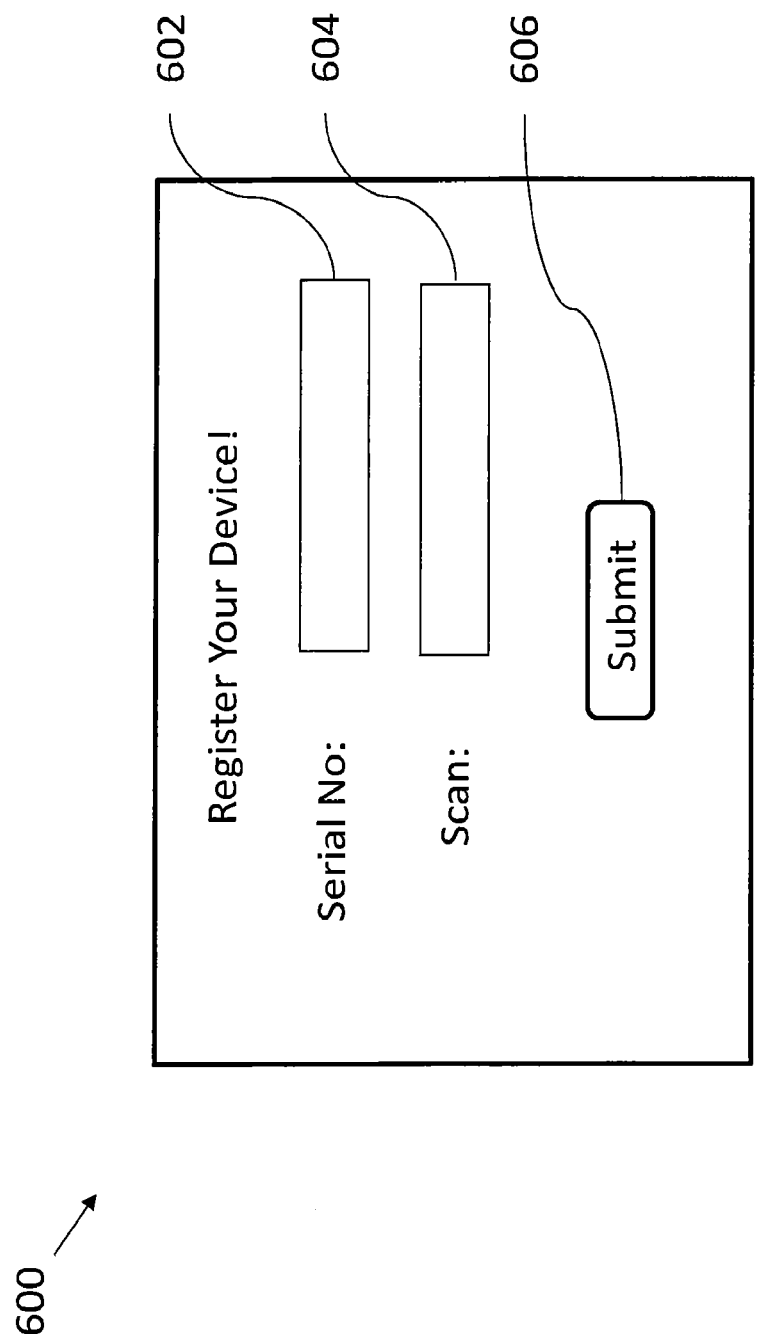
FIG. 6 shows a flow diagram of a user interface for associating the massager with a user account.

Referring now to FIG. 6, there is shown a user interface 600 for prompting a user to register her/his massager, i.e., associate his/her massager with his/her user account. In practice, each massager may have a unique label/tag/identifier identifying the particular massager. The tag/label/identifier may be an alphanumerical/symbolic sequence, e.g., a serial number 120 (FIG. 1), to be entered manually by a user, or a barcode, a radio-frequency identification (RFID) tag/label, a quick response (QR) code, represented as 122 (FIG. 1) to be scanned using a camera or other device. It will be recognized that these identifiers are examples, and that any other suitable identifier now known or hereafter developed are included within the scope of the invention.

At 602, there is shown a mechanism (e.g., a field) for receiving a manual input of the identifier of the massager (e.g., a serial number). At 604, there is shown a mechanism for receiving a scan of a code (QR code) identifying the massager. At 606, there is shown a mechanism (e.g., a button) for submitting the input for transmission to the message processing unit. In embodiments, where the message processing unit is contained within an application server, e.g., 210 of FIG. 2), the application server 210 associates the massager as identified by the identifier with an account of the user, the account having one or more message preferences, as input/selected by the user (at FIG. 5). Once the user has registered her/his massager with the application server, the user may input other selections to the user interface presented while she is logged into her/his online account with the solution service provider.

Figure 7:
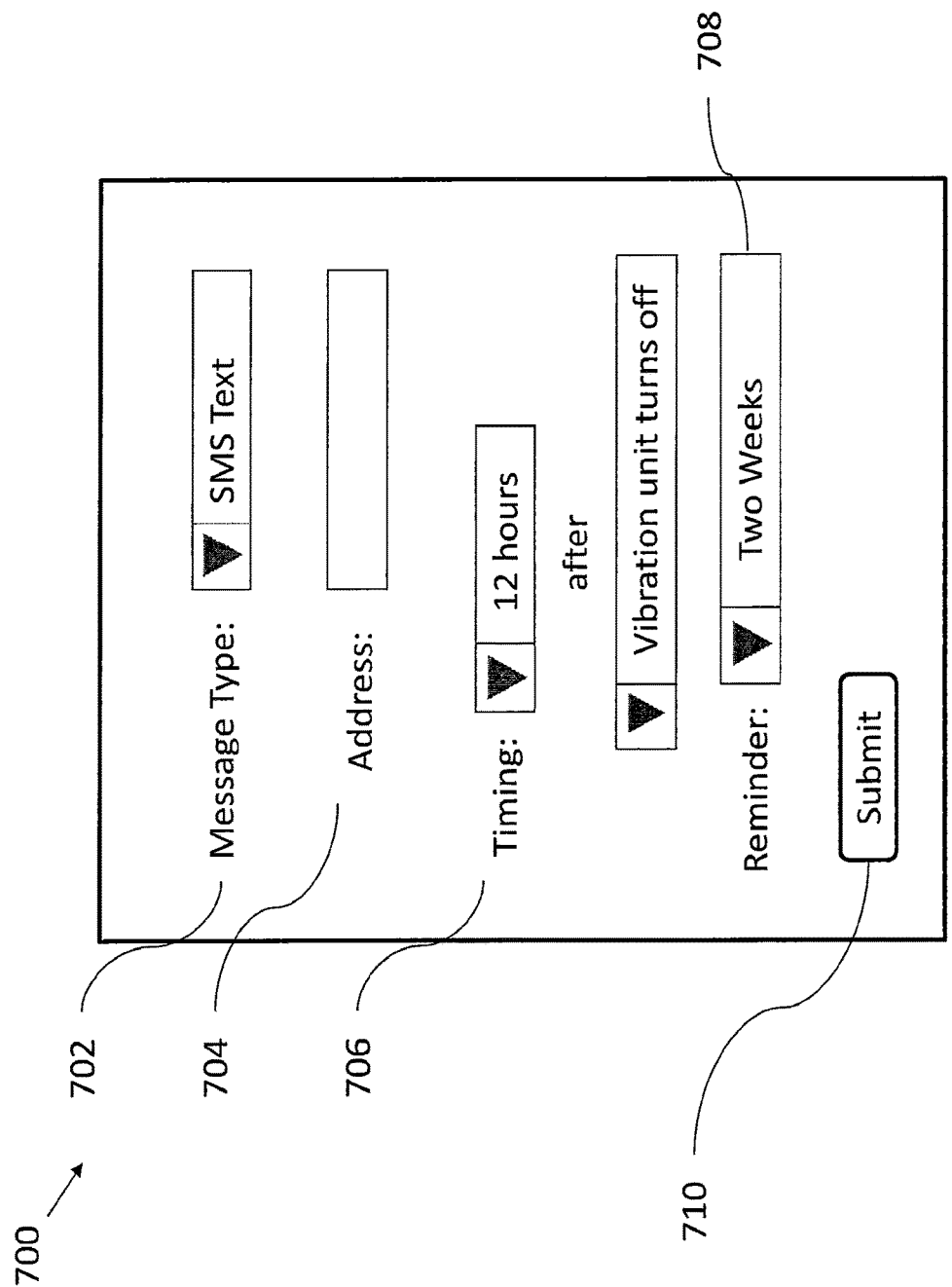
FIG. 7 shows a user interface for prompting a user to enter a message medium type, target, event, and reminder.

Referring now to FIG. 7, there is shown a user interface 700 for prompting a user to enter a message medium type, target, event, and reminder. At 702, there is shown a mechanism (e.g., a drop box), for receiving a message medium type selection. Message medium type selection may be achieved by a user inputting one or more types of message she/he wishes to be sent. Message medium type options are, for example, an email message, a text message (such as short message service (SMS) message), an instant message (such as an AOL® instant message), a multimedia message (such as MMS message), a voice message, a voice mail message, a video message, an automated telephone call, a voice-over IP call, a social media message (such as a Facebook® message, Twitter Message®, Linked-In Message®, etc.), a social media post (such as a post to a Facebook® Wall®, a "tweet" on Twitter®, etc.), a blog post, or any other form of electronic or automated message now known or hereafter developed.

At 704, there is shown a mechanism (e.g., a field) for receiving a target selection. In some embodiments, there may be multiple targets entered for simultaneous or in-tandem user feedback messages. The target may be a phone number, email address, voicemail box, social media receptacle (like Facebook® private messenger inbox, Twitter® private messenger inbox, Facebook® Wall®, Twitter account, Linked-In® account, etc.), instant message inbox (e.g., AOL® instant messenger inbox), or any other address for receipt of messages now known or hereafter developed.

At 706, a mechanism (e.g., drop box(es)) is shown for receiving a selection of an event to trigger sending of the user feedback message(s). An "event" is a trigger for sending a message, for example, to the target. Event selection may be achieved by a user selecting an event which will trigger sending of a message(s). Examples of events are deactivation of the vibration unit of the massager, activation of the vibration unit, powering down the massager, powering on the massager, and/or a predetermined duration of time elapsing after any of the aforementioned events. These are examples, and any other suitable event is included within the scope and purpose of the invention. In some embodiments, the event is based on a lapse of time. A default setting may be 1 hour after deactivation of the vibration unit of the massager. It will be recognized that these events are examples, and any other suitable event is included within the scope and purpose of the present invention.

At 708, there is shown a mechanism (e.g., a drop box) for receiving a selection of a time period for a reminder. Optionally, the reminder may be associated with a particular message or message medium type. The reminder may be established, such that a random or specific "reminding content item" is set as a user feedback message to a target in response to a "reminder event", which may be, for example, the message processing unit detecting an elapse of time of a predetermined duration (e.g., two weeks) from the last use of the massager (e.g., no receipt of a user feedback message in the last two weeks). The message processing unit may monitor for the occurrence of the reminder event, e.g., an elapse of the time duration. When the reminder event occurs, e.g., the predefined duration elapses, a reminding item of content, such as a phrase like "Where have you been?", "Is everything OK?", "I miss you", etc., may be sent as content in a user feedback message to a target. In other embodiments, the message processing unit may interrogate or query the massager periodically. In some embodiments, the query could be internal within a message processing unit of the massager. In other embodiments, the query could be sent from a message processing unit at an application server for receipt at the massager. For example, if the application server has not received a user data message from the massager after a predetermined duration (e.g. 1 week), then the application server may send a query message to the massager. In response, the massager may respond with a user data message. The application server receives the user data message in response to the query of the massager.

At 710, there is a mechanism (e.g., a button) for submitting the input for receipt at the message processing unit.

Figure 8:
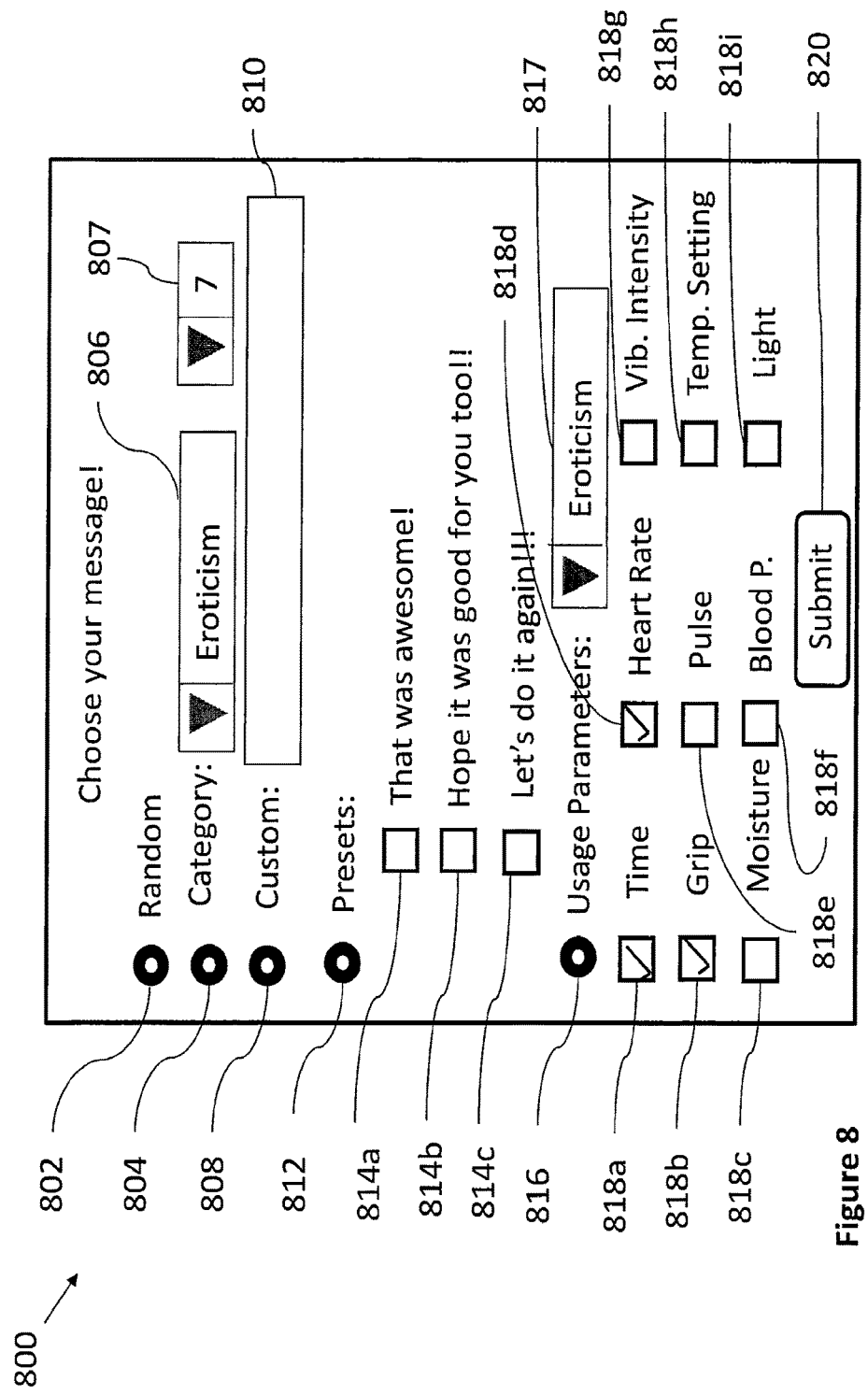
FIG. 8 shows a user interface for prompting a user to make content generation selections.

Referring now to FIG. 8, there is shown a user interface 800 for prompting a user to make content generation method selections. Example options include: random, categorical, custom, pre-sets, or usage parameters.

At 802, there is shown a mechanism (e.g., a radio button) for receipt of a selection corresponding to random computer-generated content. The application server may automatically generate user feedback messages using a content repository having a pool/bank of preset items of content, e.g., instances of phrases, images, photos, illustrations, videos, audio clips, webpages, website links, and/or any other suitable items of content now known or hereafter developed.

At 804, there is shown a mechanism (e.g., a radio button) for receipt of a selection corresponding to content from one or more categories. In this example, upon selection of such radio button, mechanisms (e.g., drop boxes), shown herein at 806 and 807, may be activated from which a user may respectively choose (a) one or more categories, and (b) an intensity level of the content from such category, as discussed further herein below.

At 808, there is shown a mechanism (e.g., a field) for receipt of a selection of a customized, or user-created, item of content. A user may input customized items of content of her/his own, which are saved to the repository, and made available to the user, and in some embodiments, for selection by other users as well. At 810, a mechanism (e.g., a field) is shown for capturing the input (text for the message, upload of a multimedia video, etc.) from the user.

At 812, there is shown a mechanism (e.g., a radio button) for receipt of a selection of preset content. At 814a-814c, there is shown mechanisms (e.g., check boxes) for receipt of selections from a set of pre-set items of content. It will be recognized that in some implementations, more or fewer than three pre-set items of content may be provided.

At 816, there is shown a mechanism (e.g., a radio button) for receipt of a selection of content based on detected usage parameters. At 817, there is shown a mechanism (e.g., a drop box) that may be activated by the user's selection of the radio button for usage parameter detection, from which a user can further select a particular category from which content may be selected based on the usage parameters (e.g., level of eroticism, comical effect, assistive effect, etc.). At 818a-818i, there are shown mechanisms (e.g., check boxes) for receipt of selections of particular usage parameters for content generation. Example parameters shown are duration between activation and deactivation of the vibration unit, i.e. session time 818a, grip pressure 818b, amount of moisture 818c, heart rate 818d, pulse 818e, blood pressure 818f, vibration intensity 818g, temperature setting 818h, and illumination settings 818i. These are examples, and all other feasible usage parameters are included within the scope of the invention.

At 820, there is shown a mechanism (e.g., a button) for submitting the input for receipt at the message processing unit.

Figure 9:
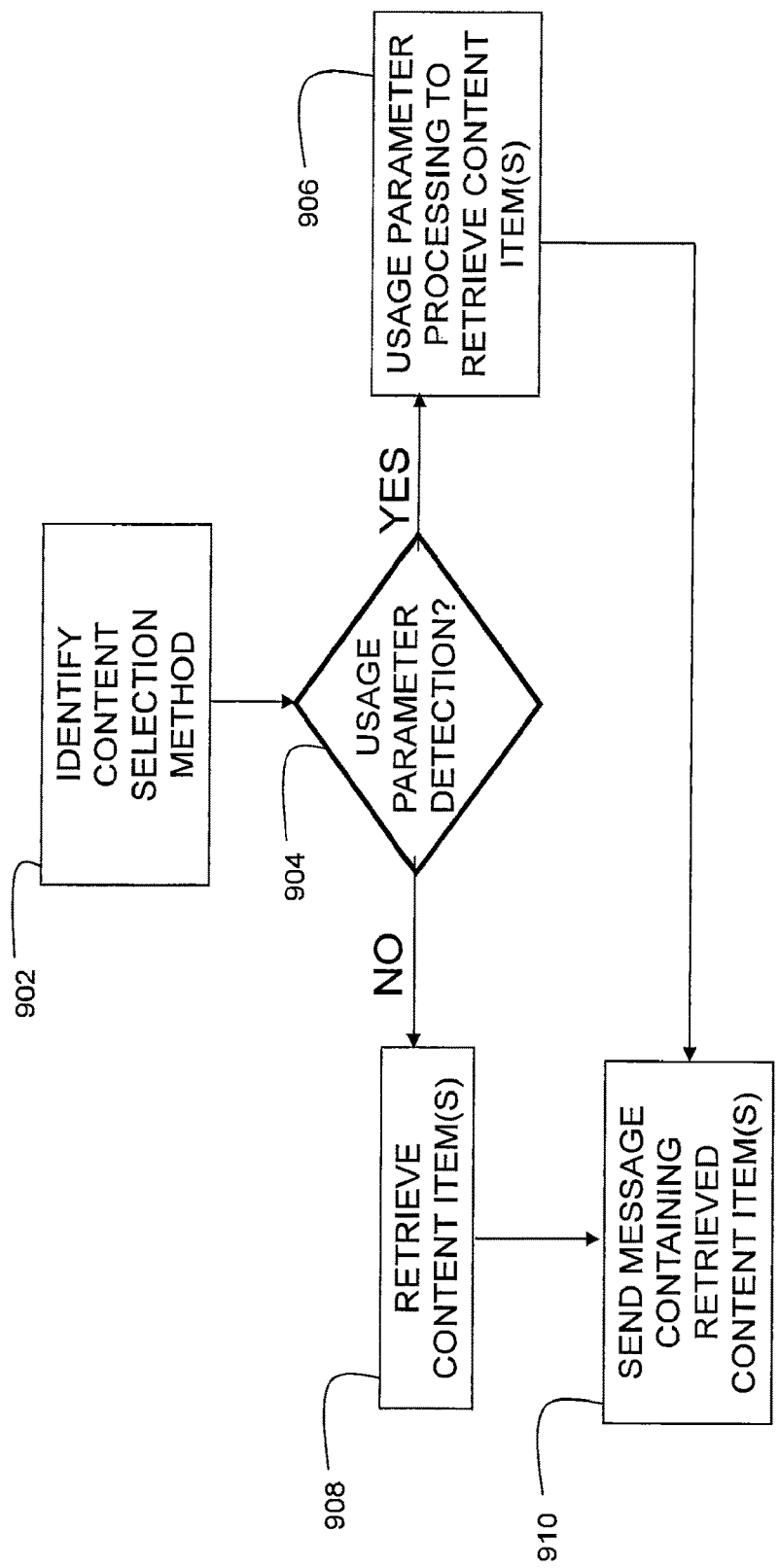
FIG. 9 shows a flow diagram of a method for generating content.

Referring now to FIG. 9, there is shown a flow diagram of a method for generating content. It will be recognized that this method is an example, and that any other suitable method is included within the scope of the invention. At 902, the selected content selection method is identified based on previously established user preferences (e.g., received at user interface 800 of FIG. 8). In this example, options include, but are not limited to, random, categorical, customized, pre-set, usage parameter detection, any combination thereof, and any other suitable method. Referring again to FIG. 9, if at 904, the usage parameter detection option is identified, the process continues to usage parameter processing 906, more fully described with respect to FIGS. 10A-10D. If at 904, usage parameter detection is not selected, one or more content items is retrieved at 908 by the selected method. If the selected method is random, content from the content repository is randomly retrieved. If the selected method is categorical, one or more content items from the associated category of the determined intensity are retrieved. If the selected method is custom, one or more custom content items is retrieved. If the selected method is pre-set, one or more of the selected pre-set content item(s) is retrieved. At 910, the retrieved content item(s) is sent as a user feedback message to a target in response to a determination that an event has occurred.

In some embodiments, in which "category" (i.e. categorical method) is selected, content items may be selected for inclusion in user feedback messages from the at least one chosen category. In such embodiments, content stored in a message repository is categorized according to a schema. A schema could be based on, for example, levels of "eroticism". The categorizations may be based on pre-set defaults (e.g., as set by a manufacturer) and/or an analysis of user ratings of the items of content. For example, users could be asked to rate the content of user feedback messages based on level of eroticism, where the intensity level is graded on a numerical scale of 1 to 10, with 1 being sterile, 3 being friendly, 5 being flirty, 7 being romantic, and 10 being erotic. In some embodiments, the category/schema may be based on level of comical effect (i.e. how funny the content is). In some embodiments, the category/schema may be based on assistive effect. For example, assistive categories may include "helpful suggestions" for use of the massager (e.g., "Next time, press a little harder", or "Try a different angle", etc.), general "encouraging words" ("You must feel a lot better now!" or "Great massage!", etc.), "cautionary warnings" ("Use a low vibration setting if you are close to bone", etc.), etc. It will be recognized that these categorizations are meant to be examples and any suitable categorization schema is included within the scope of the present invention. In some embodiments, the category may be selected by the user. In other embodiments, the category is a default setting. For example, the massager could be configured for use as a neck massager, and only "assistive effect" items of content are available. Therefore, in such a case, the user may only choose intensity level, rather than category. In some embodiments, the items of content may be randomly identified from the one or more selected categories. In some embodiments, the items of content from the one or more selected categories, or from all of the categories (e.g., in tandem), may be selected from a queue or other suitable mechanism for inclusion in user feedback messages. In some embodiments, a user may not choose an intensity level, and the items of content are, therefore, identified according to random intensity levels or from a queue (e.g., highest intensity to lowest, or lowest to highest, etc.).

Referring now to FIGS. 10A-10D, there are shown flow diagrams of methods for generating content for a user feedback message based on usage parameter detection (e.g., 816 of FIG. 8 and 906 of FIG. 9). It will be recognized that the usage parameters chosen for illustration in such figures as well as the associated methods shown herein are examples, and that any suitable usage parameters and associated methods are included within the scope of the invention. Such methods can account for one or more usage parameters including, without limitation, temporal (e.g., duration between activation and deactivation of the vibration unit of the massager), a set of device settings (e.g., a temperature setting of a heating/cooling mechanism (e.g., 107 of FIG. 1) associated with the massager during the use, a setting of an illumination mechanism associated with the massager, etc.), and/or a set of physiological (biometric) parameters. The physiological parameters may include, without limitation, heart rate, blood pressure, pulse, body temperature, skin conductivity, moisture, grip pressure, and any other suitable physiological parameters. For example, a massager may have a detector (104 of FIG. 1), which may include a timer and/or at least one biometric sensor (e.g., 306 of FIG. 3) and/or at least one settings encoder. In some embodiments, the usage parameter(s) to be included within the method may be a preprogrammed or default selection, and/or in some embodiments, a user may select which usage parameters will be included within the method (e.g., 818a-818i of FIG. 8). In some embodiments, a user may enter (and an application server may receive) demographic or preference information to the user interface of the massager or into an appropriate mechanism at her/his account, so that the thresholds as more fully described below are set appropriately for her/his gender, age, or other demographic, or according to her/his preferred threshold levels. In some embodiments, the thresholds are set according to demographic data. For example, a heart rate threshold would be higher for a 25 year old as compared to a 50 year old.

Figure 10A:
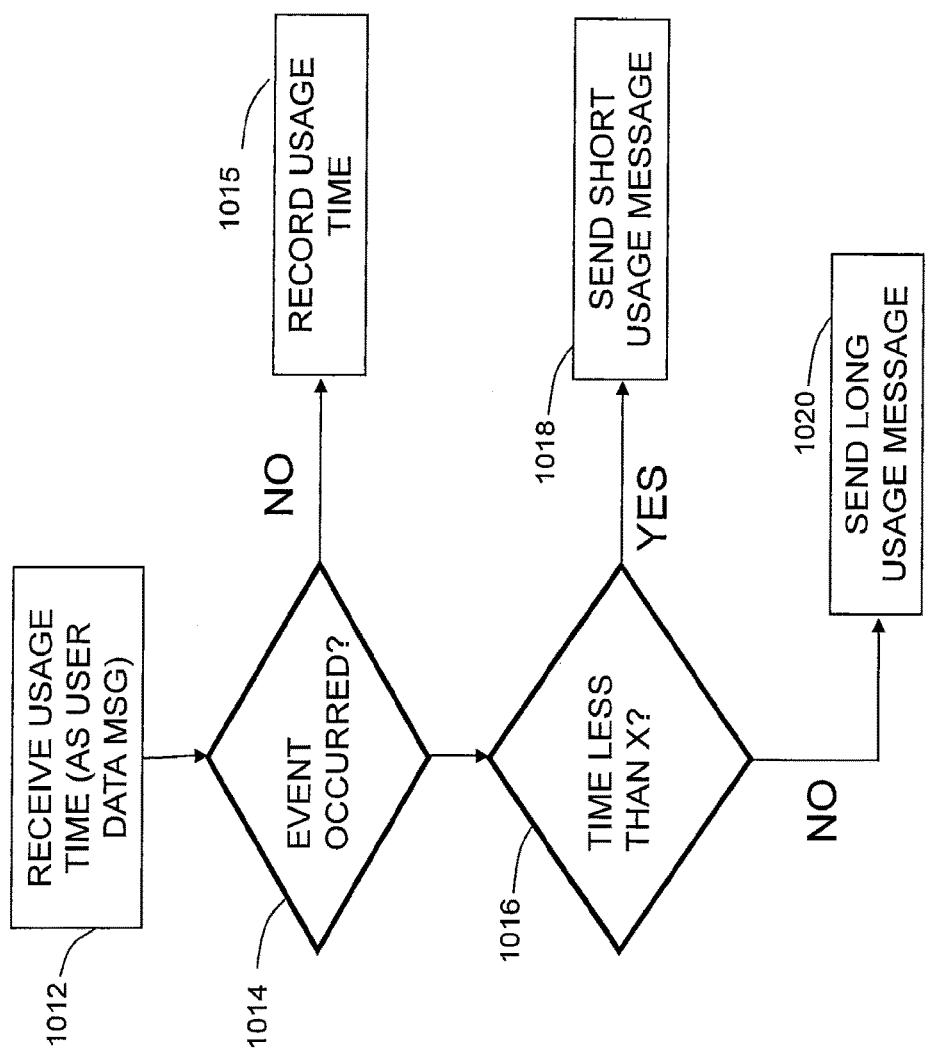
FIGS. 10A-10D show flow diagrams of methods for generating content based on usage parameters.

Referring to FIG. 10A, there is shown a flow diagram of a method for generating content for a user feedback message based on a time (duration) of usage with which the user applied the massager to a body area ("time usage"). In the example, the event has been set as a transition of the vibration unit of the massager from an ON state to an OFF state. In step 1012, a usage time is received (e.g., in minutes) at the message processing unit in the form of a user data message. The reading may be obtained by a timer in the massager. The user data message may also include a notification that the vibration unit has been turned from ON to OFF. In step 1014, it is determined whether an event has occurred based on an analysis of the user data message. If no, the information from the user data message may be recorded, and stored for later use when an event has occurred, in step 1015. If yes, in step 1016, a determination is made as to whether the usage time is less than a predetermined time interval threshold (e.g., 120 seconds) depicted as "X" in FIG. 10A. If the usage is less than the predetermined time interval (threshold), then a short usage item of content is sent to the target(s) in a user feedback message in step 1018. If the usage is greater than or equal to the predetermined threshold, then a long usage item of content is sent to the target(s) in a user feedback message, in step 1020. In some embodiments, multiple time thresholds may be used, such that a short item of content is sent to the target if the usage time is below a first threshold, and an "extra long" item of content is sent if the usage time exceeds a second predetermined threshold. For example, if the usage time is less than 120 seconds, the content of the user feedback message sent to the target may read: "That was quick!" or "In a hurry?" If the usage time exceeds the second predetermined threshold (e.g., 1200 seconds), the "extra long" item of content in a message sent to the target(s) may include a phrase like: "Way to take your time" or "Finally!"

Figure 10B:
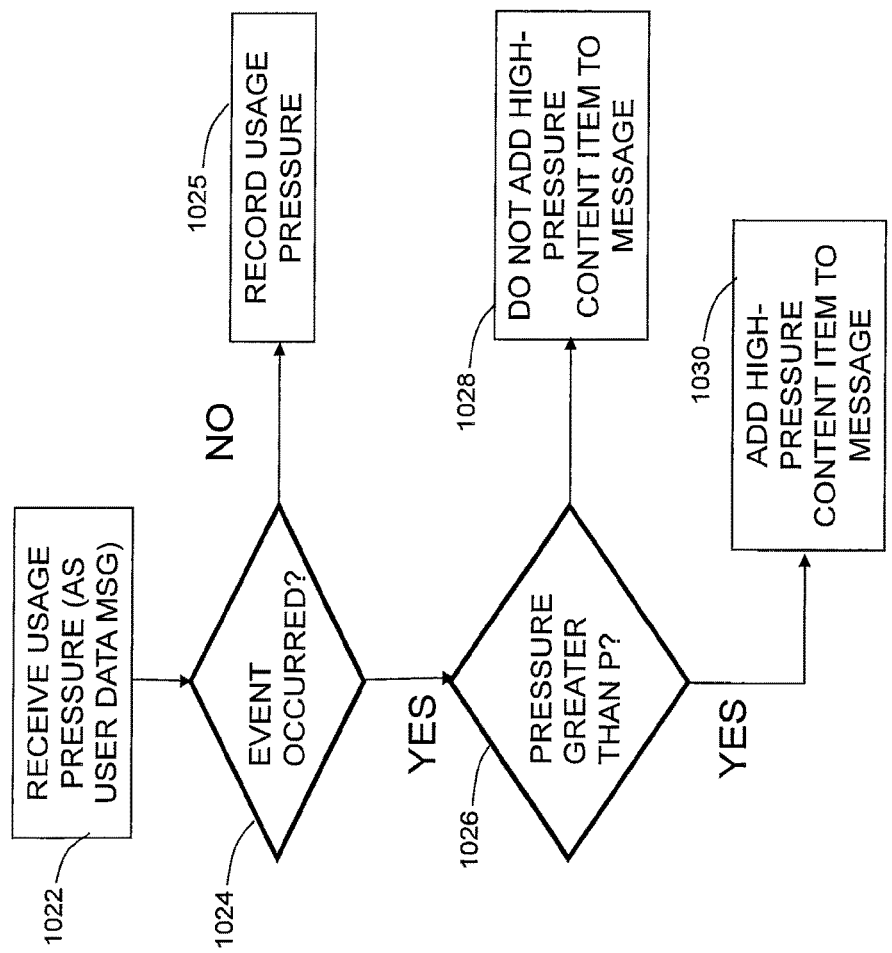

Referring to FIG. 10B, there is shown a flow diagram of a method for generating content for a user feedback message based on a pressure with which the user applied the massager to a body area ("usage pressure"). In the example, the event has been set as a transition of the vibration unit of the massager from an ON state to an OFF state. In step 1022, a pressure reading is received (e.g., in maximum pounds of force exerted on the body surface during the last usage), at the message processing unit in the form of a user data message. The reading may be obtained by a sensor, for example, in the shaft of the massager. The user data message may also include a notification that the vibration unit has been turned from ON to OFF. In step 1024, it is determined whether an event has occurred based on an analysis of the user data message. If no, the information from the user data message may be recorded, and stored for later use when an event has occurred, in step 1025. If yes, in step 1026, a determination is made as to whether the usage pressure is greater than a predetermined threshold (e.g., 110 pounds) depicted as "P" in FIG. 10B. If the usage pressure is less than the predetermined threshold, no additional content item is added to the user feedback message in step 1028. If the usage is greater than or equal to the predetermined threshold, then a high pressure content item is added to the user feedback message that is sent to the target(s) in step 1030. In some embodiments, the high pressure content item may include a phrase like "Awesome deep tissue massage!", "I love it when I'm so close to you!" etc.

Figure 10C:
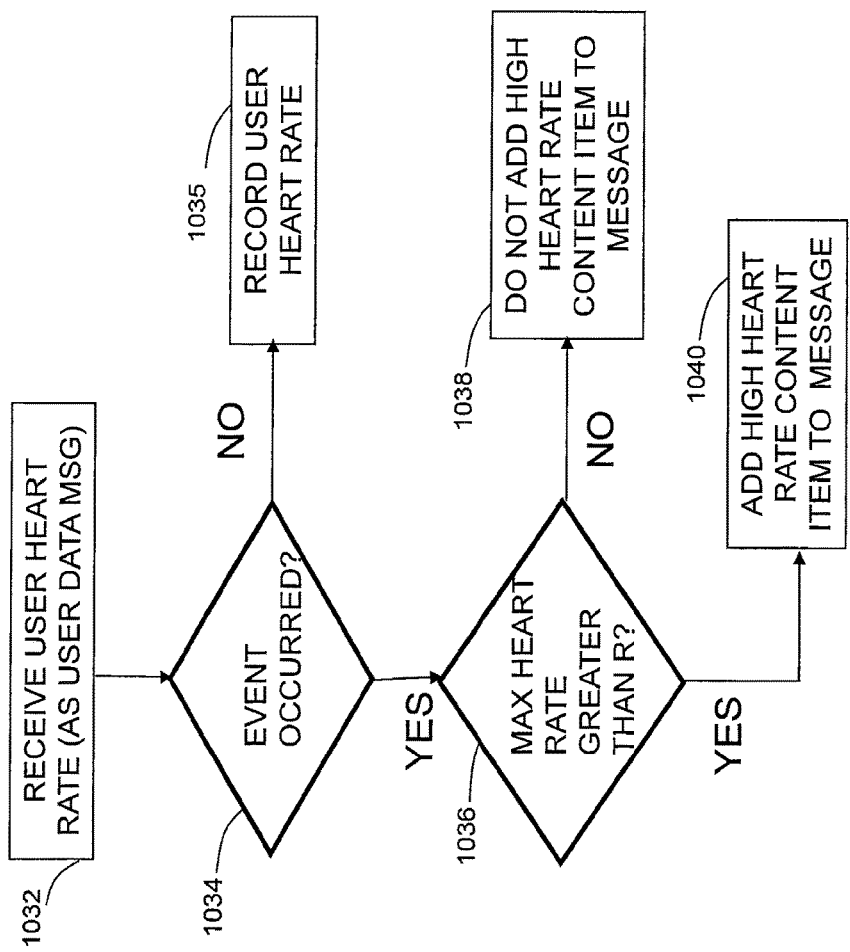

Referring to FIG. 10C, there is shown a flow diagram of a method for generating content for a user feedback message based on a heart rate (pulse rate) of usage with which the user applied the massager to a body area ("user heart rate"). In the example, the event has been set as a transition of the vibration unit of the massager from an ON state to an OFF state. In step 1032, a user heart rate is received (e.g., in beats per minute) at the message processing unit in the form of a user data message. The reading may be obtained by a biometric heart rate sensor in the massager. The user data message may also include a notification that the vibration unit has been turned from ON to OFF. In step 1034, it is determined whether an event has occurred based on an analysis of the user data message. If no, the information from the user data message may be recorded, and stored for later use when an event has occurred, in step 1035. In step 1036, a determination is made as to whether the maximum heart rate is greater than a predetermined heart rate threshold (e.g., 140 beats per minute) depicted as "R" in FIG. 10C. If the heart rate is less than the predetermined threshold, then no additional content item is added to the message in step 1038. If the heart rate is greater than or equal to the predetermined threshold, then a high heart rate content item is added to the message that is sent to the target(s), in step 1040. In some embodiments, the high heart rate content item may include a phrase like "Great workout!", "You burned some calories that time!", and/or words of caution/warning, like "Your heart rate was up—Be careful, my friend", etc. A warning may be incorporated into the content according to potentially harmful levels for any of the detected usage parameters. Thus, embodiments of the present invention send a user feedback message based on a detected maximum heart rate during last usage.

Figure 10D:
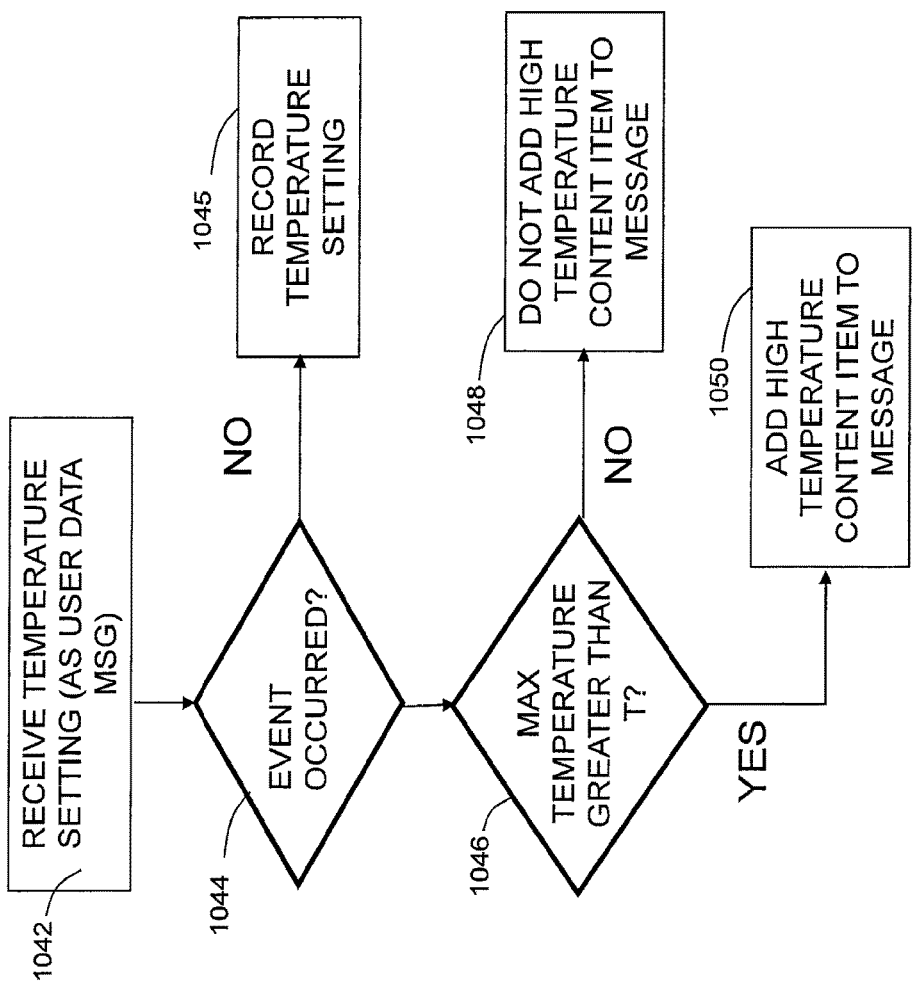

Referring to FIG. 10D, there is shown a flow diagram of a method for generating content for a user feedback message based on a temperature setting (heat setting) of usage with which the user applied the massager to a body area ("temperature setting"). In the example, the event has been set as a transition of the vibration unit of the massager from an ON state to an OFF state. In step 1042, a temperature setting is received (e.g., in degrees, or in a numerical value indicating a temperature setting of the device) at the message processing unit in the form of a user data message. The reading may be obtained by a temperature switch settings encoder of the massager. The user data message may also include a notification that the vibration unit has been turned from ON to OFF. If no, the information from the user data message may be recorded, and stored for later use when an event has occurred, in step 1045. In step 1046, a determination is made as to whether the maximum temperature setting is greater than a predetermined temperature threshold (e.g., 35 degrees Celsius) depicted as "T" in FIG. 10D. If the temperature setting is less than the predetermined threshold, then no additional content item is added to the user feedback message in step 1048. If the maximum temperature setting is greater than or equal to the predetermined threshold, then a high temperature setting content item is added to the user feedback message that is sent to the target(s) in step 1050. In some embodiments, the high temperature setting may include a phrase like "That was HOT!", "You really raised the heat!", "Muscle pain doesn't stand a chance to that heat!", etc. In some embodiments, minimum temperature setting can be substituted, and phrases modified accordingly, like "That was cool!" Thus, embodiments send a user feedback message based on the temperature setting during last usage. In addition to the temperature setting switch encoder, other encoders for other user settings may also be present in massager 100. These include, but are not limited to, a vibration setting switch encoder, and an illumination setting switch encoder. The various encoders record the current user settings such that they can be relayed to the application server. In some embodiments, the current user settings may be managed by the computer 109, instead of, or in addition to, using encoders, and these settings may be made available to the application server as system calls.

In some embodiments, the user data messages, as described in the examples of FIGS. 10A-10D, are internal messages from a usage parameter detector to a message processing unit, both implemented by a processor of the massager. In other embodiments, the user data messages are sent over a network from the usage parameter detector to a message process unit at a remote device or application server. A user data message may be sent to the message processing unit in response to deactivation (transition from ON to OFF) of the vibration unit of the massager, at predetermined time intervals, in real-time, in response to a query from the message processing unit, in response to an event, or any other suitable time.

In embodiments, one or more of the items of content generated in FIGS. 10A-10D may be appended together to make a composite user feedback message. For example, if short usage, high pressure, high temperature, and high heart rate are detected, a composite of content items for a user feedback message may be formed by appending content items from the respective usage parameters. For example, the user feedback message in the aforementioned case may read "That was quick! I love it when I'm so close to you! Great workout! That was HOT!"

Referring now to FIG. 11, there is shown a repository—database table 1100 for storing and organizing items of content. It will be recognized that the repository table is an example, and any other suitable repository is included within the scope of the invention. In practice, the repository for storing the content items may be at least one database, table, or other storage device. In some embodiments, when a user enters a customized content item, it may be stored and made available to that user, and in some embodiments, other users as well. Table 1100 includes column 1102 that stores an intensity value, column 1104 that stores a rating, column 1106 that stores an attribute word, and column 1108 that stores a content item or identifier/address of a content item (e.g., a link to a website, such as shown in the content item column of row 1128). For example in some embodiments, the content may further include a video, image, other content types, and/or a uniform resource locator or other pointer pointing thereto. Other embodiments may include more, fewer, or different columns and/or rows. The intensity column 1102 may represent a rank level of a content item (e.g., ranked similarly to the categorizations on a scale like the "category" schema). The intensity ranking may be entered by a user or an administrator of the application server. In some embodiments, a crowdsourcing approach may be used to determine the intensity ranking (e.g., by tabulating votes from a plurality of users regarding the intensity of various phrases).

In some embodiments, the intensity ranking is based on a category/schema, such as eroticism, comical effect, assistive effect, etc. like as described above with respect to the categorical content selection method. The rating column 1104 may represent the aggregate user ratings (e.g., from crowdsourcing user ratings) for a particular content item in terms of how much a particular content item is "liked", i.e., how highly it is ranked. In some embodiments, the rating may be, for example, without limitation, on a scale from 1 to 10, with 10 being most favorable, and 1 being least favorable.

The attribute word column 1106 contains an attribute word. The attribute word may be a bitmask indicating various usage parameter data associated with the content item. Examples of usage parameters include, for example, long usage, short usage, high pressure, low pressure, high moisture, low moisture, high heat, low heat, etc. For example, if the content item is intended for short usage (e.g., 1018 of FIG. 10A), then bit 0 of the attribute word may be set, as is the case for row 1122. If the content item is intended for high pressure, as in the case of 1030 of FIG. 10C, then bit 1 of the attribute word may be set, as is the case with row 1126. In some embodiments, these content items may be selected based on the detections and from the selected category chosen at 817 of FIG. 8.

Figure 12:
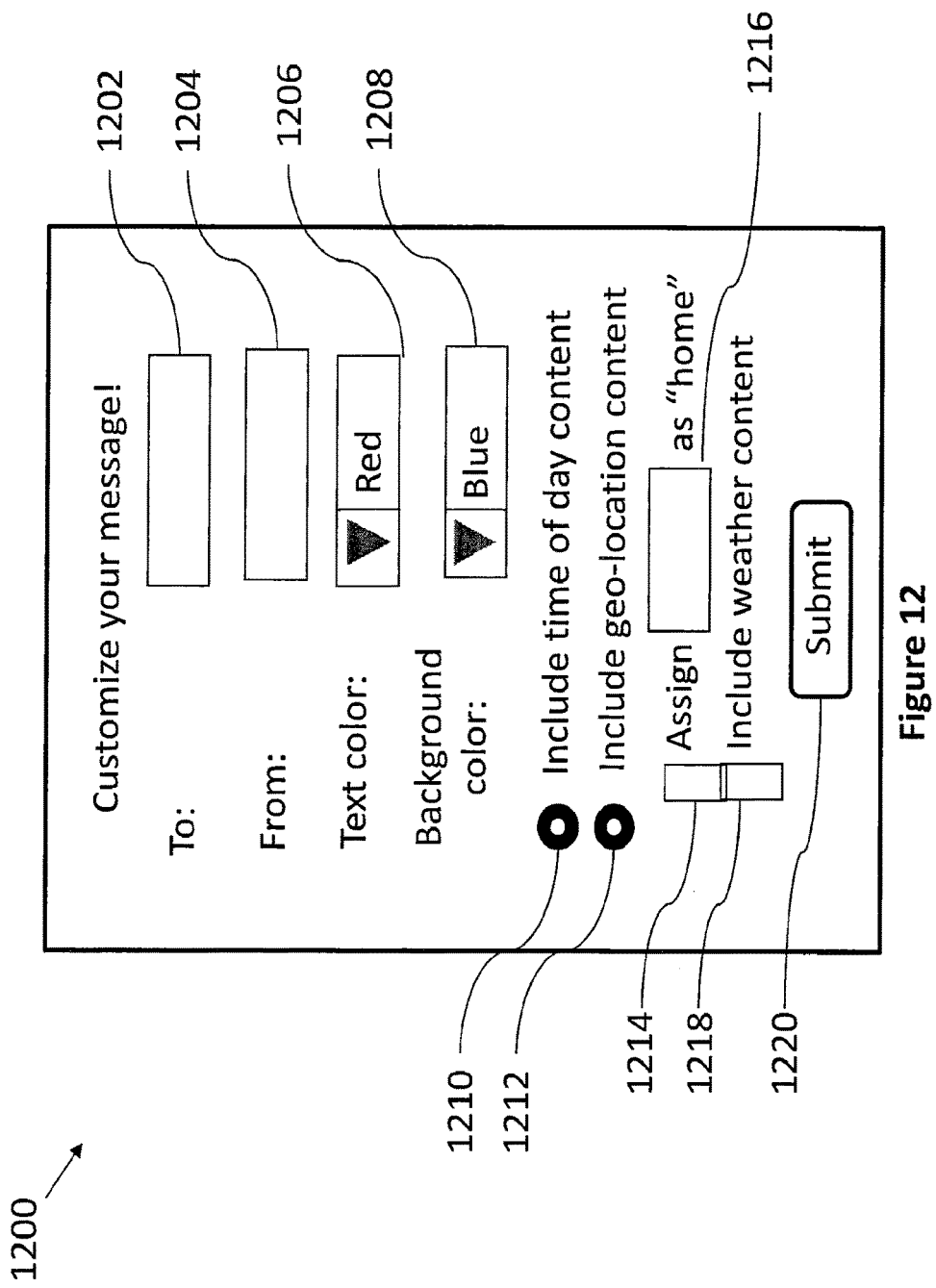
FIG. 12 shows a user interface for prompting a user to enter other customizations for a user feedback message.

Referring now to FIG. 12, there is shown a user interface 1200 for prompting a user to enter other customizations for a user feedback message. It will be recognized that any customization options are included within the scope of the invention. Those discussed herein are examples, and in embodiments, more, fewer, or other options may be available. In some embodiments, customization options may not be available.

Figure 13A:
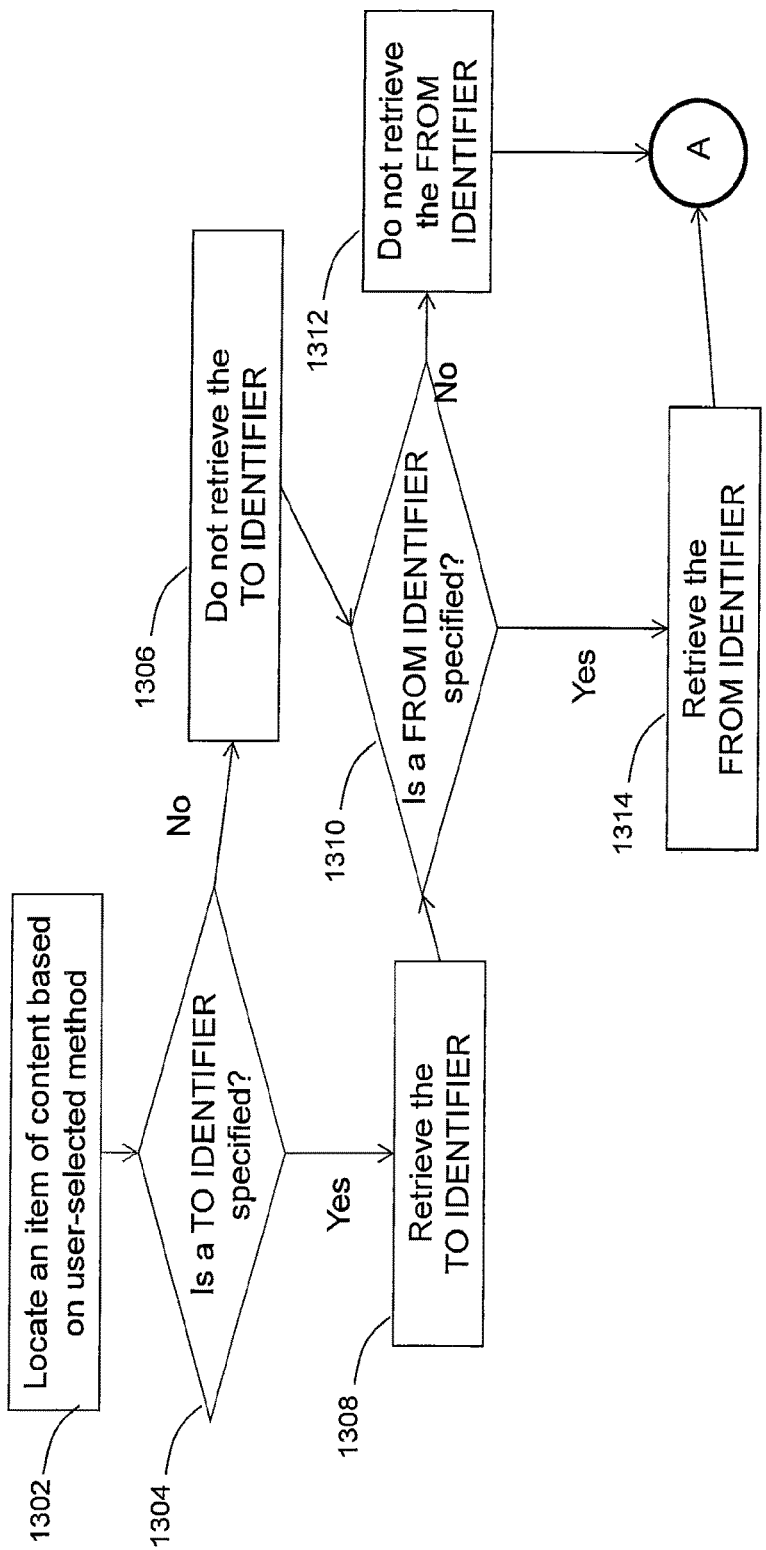
FIGS. 13A and 13B show a flow diagram of a method for appending customized content items to content items determined according to a user-selected method.
Figure 13B:
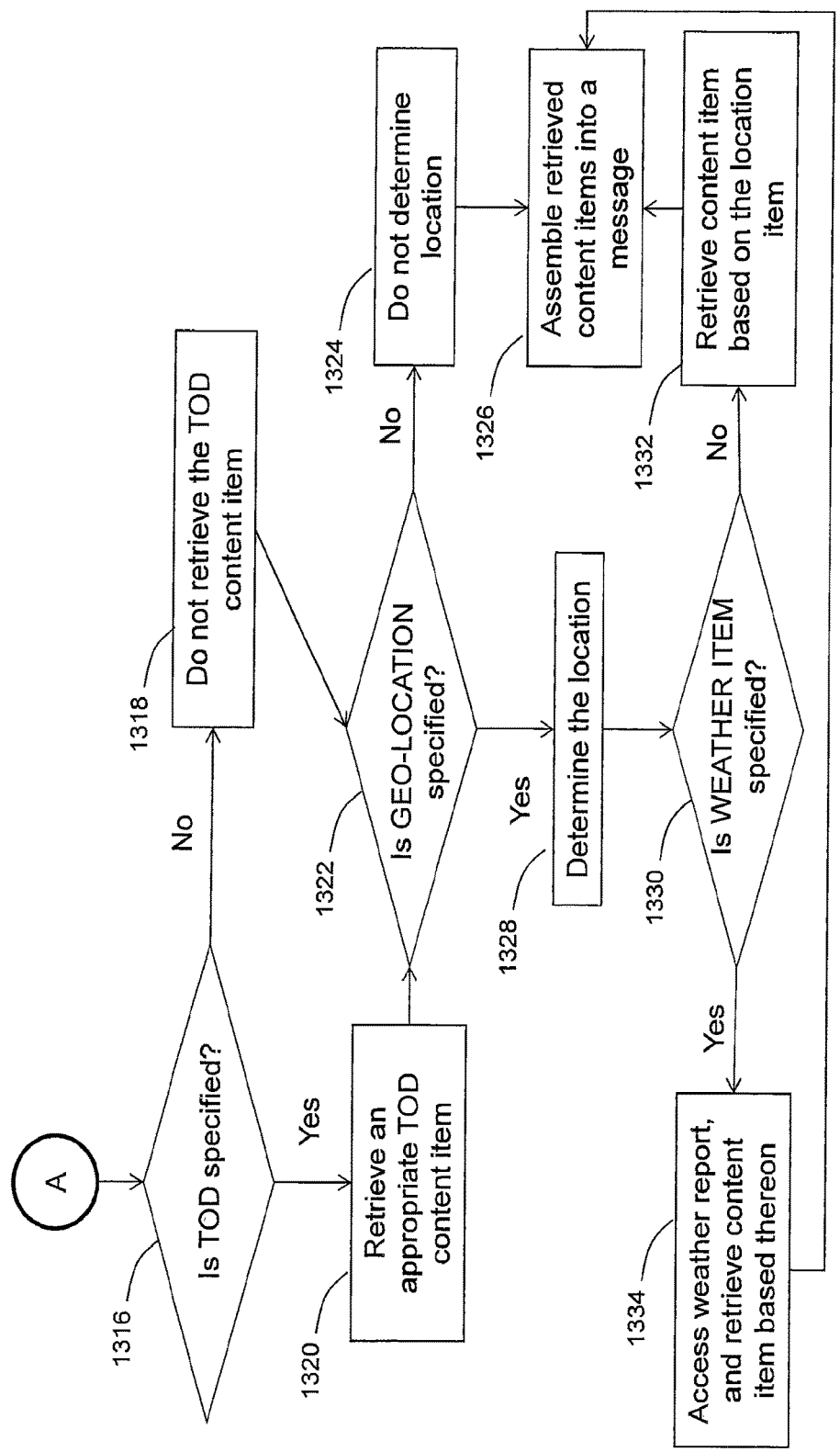

At 1202, there is shown a mechanism (e.g., a field) for receiving an input of a recipient name/identifier (or name/identifier of the user or a third party, e.g., user of third party client device 206 of FIG. 2) so the content of a user feedback message may include her/his name appended thereto. This recipient name/identifier is also referred to herein as a "to" identifier as it typically serves to identify to whom the user feedback message is directed. In some embodiments, one or more items of content (e.g., a phrase) may be stored in the repository with a variable identifier to allow substitution of the user-defined "to" identifier. For example, in row 1124 of FIG. 11, the phrase "Hey $, that was too fast!" contains the symbol "$", which serves as a placeholder for a "to" identifier, if specified by the user. Supposing the user specifies the name "Amanda," then the string of row 1124 may render as "Hey Amanda, that was too fast!" Conversely, if no name string is specified, the string of row 1124 may render as "Hey, that was too fast!" In the alternative, or in addition, in some embodiments, rather than the "to" identifier be substituted for a place holder in a particular item of content, a method as shown in FIGS. 13A-13B may determine whether a "to" identifier was received, and if so, append it as a content item to the other content item(s) of the user feedback message.

At 1204, there is shown a mechanism (e.g., a field) for receiving an input of a "from" name/identifier. This identifier is referred to as a "from" identifier as it typically serves to indicate from whom the user feedback message will appear to come, i.e. the "sender". In some embodiments, a user may enter a "from" identifier, which may be enabled in the same manners as the "to" identifier as described herein above.

At 1206, there is shown a mechanism (e.g., a drop box) for receiving an input of a color in which to render any textual content in the user feedback message. At 1208, there is shown a mechanism (e.g., a drop box) to receive a selection of the color in which to render the background of the content of the user feedback message. Other such selections could include font type, line spacing, a background image, etc.

At 1210, there is shown a mechanism (e.g., a radio button) enabling of time of day (TOD) content item(s) (e.g., a phrase, etc.). For example, if the TOD of the detected event occurrence is between the hours of 5:00 am and 9:00 am, a "Good morning!" phrase may be included in the user feedback message. See, for example, 1502 of FIG. 15.

At 1212, there is shown a mechanism (e.g., a radio button) for enabling of a geographic location ("geo-location") and/or weather-related content item(s). For example, through a location-aware system/technology, such as global positioning system (GPS) signal (i.e. GPS system 113 of FIG. 1), Wi-Fi triangulation, cellular signal triangulation, IP-based location services (based on the IP address of the massager), or other suitable technology now known or hereafter developed, the geographic location of the massager may be detected during use (e.g., the massager is powered on, or the vibration unit is activated, etc.), and/or at the time of the event occurrence, etc. A geographic location content item may be appended to other content item(s) of the user feedback message, for example, the text of: "Wow, that was a fun time in Acapulco!" and/or a photograph of a beach. Hence, a user feedback message based on a location of last usage is issued. In some embodiments, the user can elect to assign a name/title to one or more locations. For example, at 1214, there is shown a check box for enabling an association of the word "home" with a geographic location to be received in field 1216. In some embodiments, more associations can be made, like a particular location as: "John's house", etc. This functionality enables sexualized geographic location content items, like: "Haven't had that much fun at home in a while". At 1218, there is shown a mechanism (e.g., a check box) for enabling weather-related content item(s). In some embodiments, a weather report can be accessed (e.g., by the application server from a website through the Internet) for the sensed geographic location to enable weather-related content items like: "What a way to spend a rainy day!" In some embodiments, textual items of content (e.g., a phrase, etc.) may be stored in the repository with a variable identifier to allow substitution of the generic or user-defined location name/identifier. For example, the stored content item may read: "Wow, that was a fun time in #", with the geographic location entered in place of the # when the content item is included in a user feedback message. See, for example, 1508 of FIG. 15. Alternatively, or in addition, geographic and/or weather items of content may be entered to a user feedback message through process, for example, as shown in FIGS. 13A-13B. At 1220, there is shown a mechanism (e.g., a button) for submitting the input for receipt at the message processing unit.

Referring now to FIGS. 13A and 13B, there is shown a flow diagram of a method for appending customized content items to content items determined according to a user-selected method. At 1302, an item of content is located based on the user-selected method (e.g., random, categorical, customized, usage parameter detection, any combination thereof, or any other suitable method). At 1304, it is determined whether a TO IDENTIFIER was specified (e.g., at 1202 of FIG. 12). If not, at 1306, a TO IDENTIFIER is not retrieved. If so, at 1308, the TO IDENTIFIER is retrieved. The process then proceeds to 1310, where it is determined whether a FROM IDENTIFIER was specified (e.g., at 1204 of FIG. 12). If not, at 1312, a FROM IDENTIFIER is not retrieved. If so, at 1314, the FROM IDENTIFIER is retrieved. The process then proceeds to 1316, where is it determined whether TIME OF DAY was enabled (e.g., at 1210 of FIG. 12). If not, at 1318, no TIME OF DAY content item is retrieved. If so, at 1320, an appropriate TIME OF DAY content item is retrieved. The process then proceeds to 1322 where it is determined whether GEO-LOCATION was enabled (e.g., at 1212 of FIG. 12). If not, at 1324, no geo-location is determined, and the process proceeds to 1326 where the retrieved content items are assembled into a user feedback message. If so, at 1328, a geo-location is determined, and the process proceeds to 1330, where it is determined whether WEATHER ITEMS was enabled (e.g., at 1218 of FIG. 12). If not, at 1332, an appropriate content item is retrieved based on the location, and the process proceeds to 1326 where the retrieved content items are assembled into a user feedback message. If so, at 1334, a weather report is accessed, and a content item based on the weather report is retrieved. The process then proceeds to 1326 where the retrieved content items are assembled into a user feedback message. It will be recognized that this method is an examples, and that any suitable method is included within the scope of the invention. It will be recognized that in some embodiments of the invention, more or fewer steps could be included, some of the steps may be performed simultaneously, and/or the order of the steps may be different.

Figure 14:
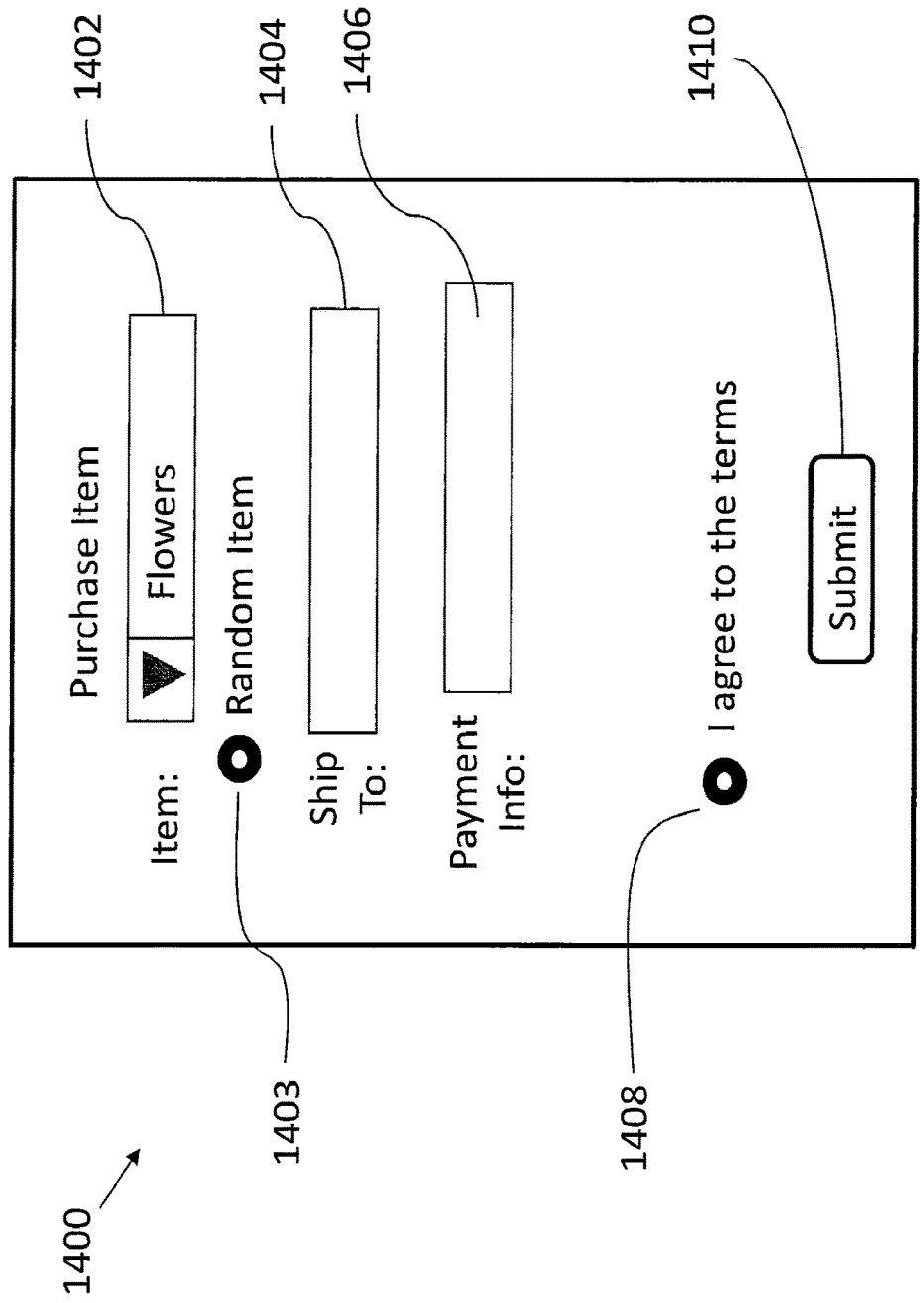
FIG. 14 shows a user interface for prompting a user to enter information for a purchase order to accompany a user feedback message.

Referring now to FIG. 14, there is shown a user interface 1400 for prompting a user to enter information for execution of an automated purchase to accompany a user feedback message in response to a determination that an event has occurred. Upon the system receiving a signal from the massager, a purchase order may be executed. In embodiments, when the massager vibration unit (see 112 of FIG. 1) transitions from an ON state to an OFF state, a UDM is sent to the application server (see 210 of FIG. 2). The UDM contains usage parameters that indicate the massager was recently used. The application server may store account and/or user profile information that lists user preferences that include random and/or prearranged purchases. Thus, in embodiments, upon receiving the UDM, the application processes a purchase order upon detecting a usage of the massager. The order may be for an object (or service), for example, a floral arrangement, which is delivered to the user's home/work address with a paper note having the content of the user feedback message thereon. In another example, an electronic gift card is delivered electronically to the user's email address with the note in the email body or as an attachment. The electronic gift card may be a credit redeemable for goods or services from a particular retailer, store, website, etc. A code and other identifying information may be sent as content item(s) in the user feedback message, or by a separate user feedback message to the target. At 1402, there is shown a mechanism (e.g., a drop down box) for receiving a selection of the object(s) to be purchased (e.g., flowers, credit, etc.). In some embodiments, at 1403, there is shown a mechanism (e.g., a button) for receiving a selection of a random item from a pool of items. For example, the pool of items may include, candy, flowers, fruit baskets, or other gifts. With the random option selected, the user does not know what the gift is until it is received. At 1404, there is shown a mechanism (e.g., a field) for receiving address/email information. At 1406, there is shown a mechanism (e.g., a field) for receiving payment information, such as credit card information. At 1408, there is shown a mechanism (e.g., a radio button) for receiving a selection that the user agrees to the terms of the sale. At 1410, there is shown a mechanism (e.g., a button) for submitting the input for receipt at the message processing unit. In embodiments, message processing unit, for example, implemented by an application server, performs the necessary e-commerce transactions to complete the sale, for example, communicating order and payment information to a third-party vendor's website. In response to a determination that an event has occurred, an automated purchase is performed.

Figure 15:
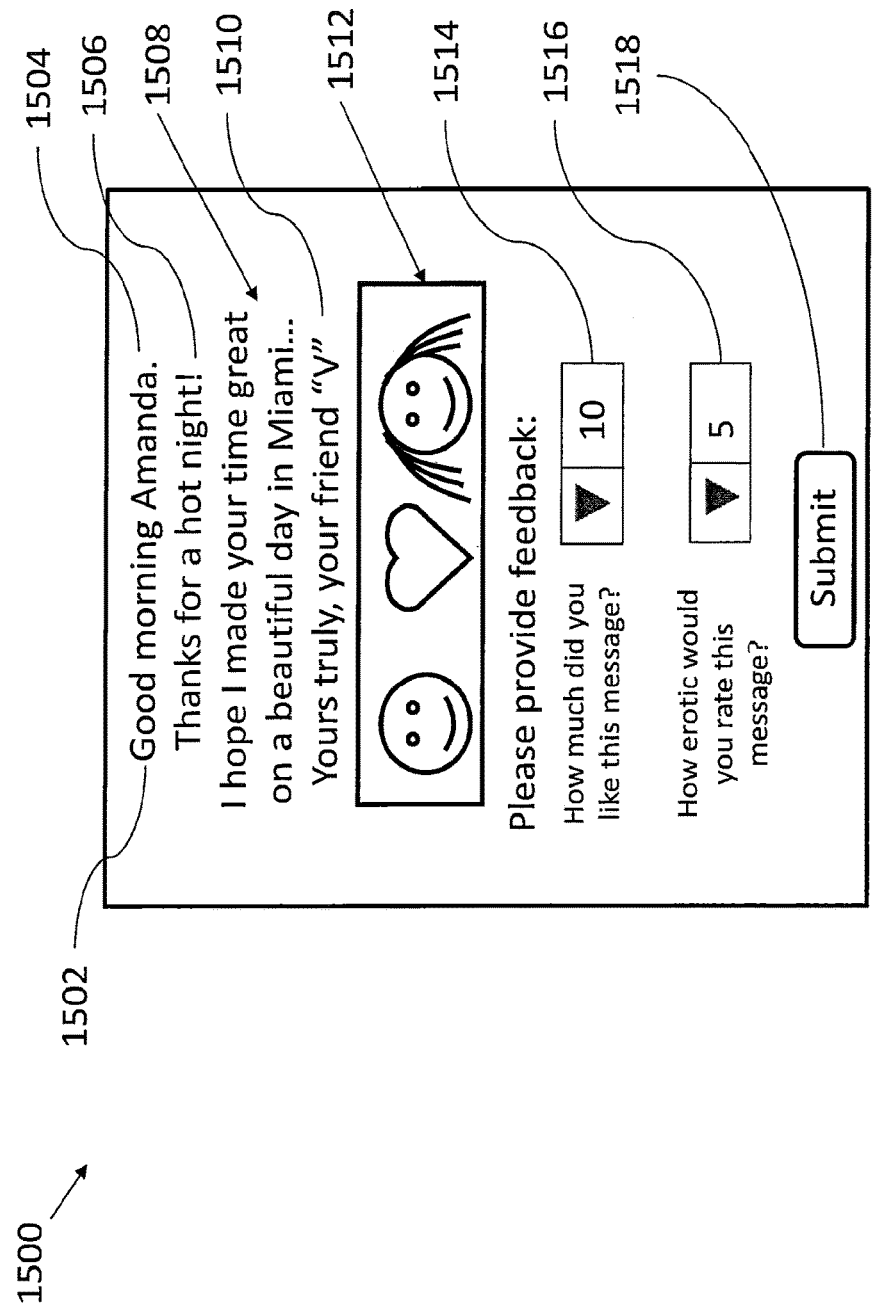
FIG. 15 shows a user interface for displaying content of a user feedback message received at a target.

Referring to FIG. 15, there is shown a user interface 1500 for displaying content of a user feedback message received at a target. At 1502, there is shown a time of day content item. At 1504, there is shown a name of a user ("a "to" identifier). At 1506, there is shown a high heart rate content item. At 1508, there is shown a composite location and weather item of content. At 1510, there is shown a sender name (a "from" identifier). At 1512, there is shown a photographic item of content having a 5 rating. It should be recognized that the user interface 1500 can be displayed on any suitable interface, such as a computer screen, mobile device screen, telephone screen, or even massager user interface screen.

Still referring to FIG. 15, in some embodiments, the user feedback message received at the target may be an interface for acquisition of feedback from the user. At 1514, there is shown a mechanism (e.g., a drop box) for receiving a rating of the message based, for example, on whether the user liked or disliked the message, whether the user thought the message was appropriate considering the use of the massager, or any other suitable criteria. Ratings received by such mechanism may be aggregated by the application server and used to rank content items. The rankings may in turn be used to determine which content items are presented in future messages. An example of a ranking schema is, for example, based on favorability, e.g., at 1514, as determined by the voting of a plurality (one or more) of users. The content items may be ranked in a prioritized manner, and the content items deemed most favorable are prioritized higher for inclusion in messages. Upon the application server receiving such feedback, a learning mechanism can be implemented to enhance the messages sent to the user, and to other users. At 1516, there is shown a mechanism (e.g., a drop box) for receiving a categorization of the message (for example, to help categorize the message according to the schema for categorical content selection, etc.). So embodiments of the invention include crowdsourcing items of content for determination of content to include in future messages. At 1518, there is shown a mechanism (e.g., a button) for submitting the input/feedback for receipt at the message processing unit.

In embodiments, user interfaces, such as those of FIGS. 6-8, 12, 14, and 15 may be accessed by the user either from a computer, remote/mobile device, or on-board user display on the massager itself (such as 326 of FIG. 3A). In embodiments, a message processing unit receives the input submitted at user interfaces, such as those of FIGS. 6-8, 12, 14, and 15, and executes the functionality of embodiments of the invention, such as functionality shown in FIGS. 4, 5, 10A-10D, 11, 13A, and 13B. Submission of the input for receipt at the message processing unit varies depending on the identity of the message processing unit. In embodiments, the message processing unit may be an application server. In such implementation, submitting the input may comprise transmission of the input to the application server by sending the information from the user interface (such as a remote device) to the application server via the internet by using a WiFi and/or cellular network. In other embodiments, a computer may be used to enter the information into a user form, which may be an HTML form rendered via a standard browser. In other embodiments, the information may be entered directly on the massager using a user interface (see 326 of FIG. 3A), and submitting the input includes sending such input directly to the application server. In some embodiments, the massager operates in a stand-alone mode, in which case, the message processing unit is the on-board computer (see 109 of FIG. 1). So, submitting the input includes recording the input within memory of the on-board computer, and the appropriate content items/messages are either sent directly from the massager to the target or displayed via the on-board user interface (see 326 of FIG. 3A). Hence, in embodiments, the options displayed in FIG. 8 are entered directly into the massager using a user interface that is on the massager itself.

An exemplary usage scenario is outlined herein to further explain various embodiments. In this embodiment, the massager (see 202 of FIG. 2) communicates via Bluetooth to a mobile device (e.g. smartphone, tablet, or the like, see 204 of FIG. 2)). The mobile device has internet access and can communicate with the application server (see 210 of FIG. 2) via the internet. Thus, in this example, the user uses her device for massaging. Every time the device vibration unit transitions from an ON state to an OFF state, it sends a message via Bluetooth, to the mobile device, referred to as a user data message (UDM). The mobile device has an app and/or background service installed and running, and receives, via Bluetooth, the UDM, which serves as a notification of the vibration unit transition from an ON state to an OFF state. The user data message (UDM) contains a unique device identifier, and information about how long the device was in the ON state (e.g. number of minutes). The mobile device (204 of FIG. 2) then sends a message to the application server (210 of FIG. 2) via the internet (see 208 of FIG. 2). The application server (210) receives the UDM with the unique device identifier, and associates it with a user account that was previously established. Within the account records are settings for various preferences. In this example, suppose that in FIG. 8, the time box 818a is checked, indicating that time (duration of most recent (last) usage) is used as a criterion for processing the UDM. The application server (210 of FIG. 2) then, using its processor (203 of FIG. 2), executes instructions in its memory (207 of FIG. 2) that process the algorithm depicted in FIG. 10A. In this example, suppose that time X (see 1016 of FIG. 10A) is 5 minutes, and the usage time in the UDM is 4 minutes, then a short message is sent from the application server to the user via e-mail (see 1018 of FIG. 10A). That e-mail may be received on the mobile device, or any other device capable of receiving e-mail.

While the example described above utilizes a mobile device as an intermediary to convey information from the massager to the application server, other embodiments may include direct communication between the massager and the application server without use of an intervening mobile device (see signal path 217 of FIG. 2). In such embodiments, the massager is equipped with a WiFi and/or cellular transceiver which provides capability to communicate to the application server without the need for a mobile device. That is, the UDM is sent directly to the application server without the need for a mobile device. In this embodiment, the user experience is similar to as described for the previous embodiment in that, after usage, the user receives an e-mail (and/or text message or other communication) from the application server based on the UDM.

In yet another embodiment, the massager operates as a standalone system. A user display (see 326 of FIG. 3A) provides feedback to the user after usage. In this embodiment, the processor on board the massager (see 114 of FIG. 1) implements an application server function. In such embodiments, the massager comprises it's own WiFi or other network connectivity. So, for example, upon transitioning from the ON state to the OFF state, the on-board computer of the massager, using its processor (203 of FIG. 2), executes instructions in its memory (207 of FIG. 2) that process the algorithm depicted in FIG. 10A, and sends the message to a target, e.g., user's email address. That e-mail may be received on the mobile device, or any other device capable of receiving e-mail. In another embodiment of a "self-contained" massager, the on-board computer, instead of sending a message via a network, displays the user feedback message through the user display. For example, again considering usage time, upon transitioning from the ON state to the OFF state, the processor on board the massager (see 114 of FIG. 1) performs the algorithm depicted in FIG. 10A, and provides a message on the user display (see 326 of FIG. 3A).

In some embodiments, the massager, together with an application server including instructions for execution (to provide functionalities of the invention), comprises a system. In some embodiments, the system includes software operating on, or for operating on, an application server (to provide functionalities of the invention). The message processing unit functionality may be implemented in the application server, massager, a remote (mobile) device, or a combination of two or more of such entities.

While shown and described herein as a massager communication solution, it is understood that the invention further provides various alternative embodiments.

For example, in one embodiment, the invention provides a computer-readable storage medium that includes computer program code to enable a computer infrastructure to provide massager communication functionality as discussed herein. To this extent, the computer-readable storage medium includes program code that implements each of the various processes of the invention. It is understood that the term computer-readable storage medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.). "Computer-readable storage medium" includes volatile and non-volatile, removable and non-removable computer storable media implemented in any method or technology for storage of information such as computer readable instructions, data structures, program modules, or other data.

In another embodiment, the invention provides a method that performs the process of the invention on a subscription, advertising, and/or fee basis. That is, a service provider, such as a Solution Integrator, could offer to provide massager communication functionality. In this case, the service provider can create, maintain, and support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for transaction authorization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

In some embodiments, the user interfaces depicted herein may be rendered via, e.g., an HTML web page (or other suitable mechanism), on a personal computer, tablet, smart phone, or other suitable device. When a user clicks any of the submit buttons, the information input may be sent to the application server (e.g., 210 of FIG. 2) through the network (e.g., 208 of FIG. 2). In some embodiments, the features of the user interfaces may be arranged differently from the arrangements depicted herein. In some embodiments, more or fewer features may be included on the user interfaces depicted herein, or the features shown on each user interface could be split among a plurality of user interfaces. In some embodiments, the features of user interfaces depicted herein could be combined to appear in a single interface. In some embodiments, mechanisms shown on the user interfaces or otherwise associated with the massager may be substituted with any other suitable mechanisms. These user interfaces are examples, and the scope of the invention includes any interface capable of receiving the information described herein.

While the invention has been particularly shown and described in conjunction with exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A massager comprising:
a vibration unit; and
at least one computing device comprising a processor and memory, the memory comprising instructions, which when executed by the processor, cause the at least one computing device to:
receive user input comprising a user preference;
analyze usage data for the massager;

determine that an event has occurred based on the analysis;
communicate at least one user feedback message to a target in response to the determination, wherein the at least one user feedback message comprises at least one item of content selected based on the user preference; and
execute a purchase order in response to the determination.

2. The massager in accordance with claim 1, wherein a shape of at least one of a housing and a shaft of the massager is configured for application of pressure to an area of a human body.

3. The massager in accordance with claim 1, the memory further comprising instructions, which when executed by the processor, cause the at least one computing device to:
receive the user preference as a data input from a user, wherein the user preference comprises at least one of: the target, a message medium type, a content selection method, the event, and a customization.

4. The massager in accordance with claim 1, the memory further comprising instructions, which when executed by the processor, cause the computer to:
receive a preference of a content selection method from a user, the content selection method comprising at least one of: random selection, categorical selection, custom-generated, a queue, and usage parameter detection; and
assemble the at least one item of content into the at least one user feedback message according to the received content selection method.

5. The massager in accordance with claim 1, further comprising a usage parameter detector, and wherein the memory further comprises instructions, which when executed by the processor, cause the computer to:
select the at least one item of content for assembly into the user feedback message based on a reading from the usage parameter detector.

6. The massager in accordance with claim 5, wherein the usage parameter detector comprises at least one of a heart rate sensor, a blood pressure sensor, a body temperature sensor, a pulse sensor, a skin conductivity sensor, a moisture sensor, a pressure sensor, a grip pressure sensor, a timer, a temperature setting switch encoder, a vibration setting switch encoder, and a light setting switch encoder.

7. The massager of claim 1, wherein the massager further comprises a global positioning system, and wherein the memory further comprises instructions, which when executed by the processor, cause the at least one computing device to: detect a geographic location of the massager during usage; and wherein the at least one item of content includes an indicator of the geographic location.

8. The massager of claim 1, wherein the memory contains a repository of items of content, and wherein the memory further comprises instructions, which when executed by the processor, cause the at least one computing device to:
select the at least one item of content from the repository for assembly into the user feedback message based on based on an intensity level of the at least one item of content.

9. A computer-implemented method comprising:
receiving user input comprising a user preference;
receiving a user data message comprising usage data of a massager;
determining that an event has occurred based on the usage data;
communicating at least one message in response to the determination, wherein the at least one message comprises at least one item of content selected based on the user preference, to a target in response to the determination; and
executing a purchase order in response to the determination.

10. The method of claim 9, further comprising:
retrieving a first item of content for assembly into a user feedback message in response to a measurement of a usage parameter greater than a predetermined level; and
retrieving a second item of content for inclusion in the user feedback message in response to a measurement of a usage parameter less than the predetermined level.

11. The method of claim 10, wherein the usage parameter comprises at least one of a heart rate, a blood pressure, a pulse, a body temperature, a skin conductivity, an amount of moisture, a grip pressure, a vibration intensity setting, a vibration pattern setting, a light setting, a temperature setting, and a duration between activation and deactivation of a vibration unit.

12. The method of claim 9, further comprising:
associating a user rating with each of a plurality of items of content; and
selecting at least one item of content for assembly into a user feedback message based on the respective user rating.

13. The method of claim 9, further comprising facilitating an automated purchase in response to the determination that the event has occurred.

14. The method of claim 9, wherein the at least one user preference comprises the target, the event, the at least one item of content, and a medium type of the user feedback message.

15. The method of claim 9, further comprising:
establishing an association between the massager and a user account; and
storing the user preference in association with the user account.

16. The method of claim 15, wherein the establishing comprises:
receiving a scan of a code identifying the massager.

17. The method of claim 9, wherein the method is performed by a solution service provider for one or more consumers.

18. A system comprising:
a massager; and
an application server, wherein the application server comprises a processor and memory, the memory comprising instructions to:
receive user input comprising a user preference;
receive a user data message from the massager;
determine that an event has occurred based on the user data message;
communicate at least one message to a target in response to the determination, where the at least one message comprises at least one item of content selected based on the user preference; and
execute a purchase order in response to the determination.

19. The system of claim 18, wherein the application server receives the user data message in response to a query of the massager.

20. The method of claim 7, wherein the indicator of the geographic location comprises text or an image.

* * * * *